United States Patent
Ackerman et al.

(10) Patent No.: US 10,901,948 B2
(45) Date of Patent: *Jan. 26, 2021

(54) QUERY PREDICATE EVALUATION AND COMPUTATION FOR HIERARCHICALLY COMPRESSED DATA

(71) Applicant: International Business Machines Corporation, Armonk, NY (US)

(72) Inventors: William B. Ackerman, N. Billerica, MA (US); Garth A. Dickie, Framingham, MA (US); Jeffrey M. Keller, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

This patent is subject to a terminal disclaimer.

(21) Appl. No.: 15/060,926

(22) Filed: Mar. 4, 2016

(65) Prior Publication Data

US 2016/0246811 A1    Aug. 25, 2016

Related U.S. Application Data

(63) Continuation of application No. 14/630,813, filed on Feb. 25, 2015.

(51) Int. Cl.
  *G06F 16/174*    (2019.01)
(52) U.S. Cl.
  CPC ................. *G06F 16/1744* (2019.01)
(58) Field of Classification Search
  None
  See application file for complete search history.

(56) References Cited

U.S. PATENT DOCUMENTS

| | | | |
|---|---|---|---|
| 5,058,144 A | 10/1991 | Fiala | |
| 5,467,087 A | 11/1995 | Chu | |
| 5,546,571 A * | 8/1996 | Shan | ................. G06F 17/30955 |
| 5,603,022 A | 2/1997 | Ng et al. | |

(Continued)

FOREIGN PATENT DOCUMENTS

| | | |
|---|---|---|
| CN | 101711001 A | 5/2010 |
| EP | 2387004 | 11/2011 |

(Continued)

OTHER PUBLICATIONS

De Moura et al. "Direct Pattern Matching on compressed text". Sep. 1998. Proceedings from String Processing and IR: A South American Symposium. DOI: 10.1109/SPIRE.1998.712987. URL Link: <https://ieeexplore.ieee.org/document/712987>. Accessed Nov. 2018. (Year: 1998).*

(Continued)

*Primary Examiner* — Neveen Abel Jalil
*Assistant Examiner* — Irene Baker
(74) *Attorney, Agent, or Firm* — Richard Wilhelm; Edell, Shapiro & Finnan, LLC

(57) ABSTRACT

According to embodiments of the present invention, machines, systems, methods and computer program products for processing data are provided. Compressed data is received and a requested operation for uncompressed data is performed on the compressed data by determining an intermediate location in a compression hierarchy of compression nodes and applying the requested operation to the data at that intermediate location.

11 Claims, 15 Drawing Sheets

(56) References Cited

U.S. PATENT DOCUMENTS

| | | | |
|---|---|---|---|
| 5,729,228 A | 3/1998 | Franaszek | |
| 5,918,225 A * | 6/1999 | White | G06F 17/30324 |
| 5,964,842 A | 10/1999 | Packard | |
| 6,032,144 A | 2/2000 | Srivastava et al. | |
| 6,195,024 B1 | 2/2001 | Fallon | |
| 6,253,222 B1 | 6/2001 | Dyer et al. | |
| 6,373,986 B1 | 4/2002 | Fink | |
| 6,396,420 B1 | 5/2002 | Augustine | |
| 6,462,680 B1 | 10/2002 | Hayes | |
| 6,577,254 B2 | 6/2003 | Rasmussen | |
| 6,624,761 B2 | 9/2003 | Fallon | |
| 6,885,319 B2 | 4/2005 | Geiger | |
| 7,024,414 B2 | 4/2006 | Sah et al. | |
| 7,139,765 B1 | 11/2006 | Balkany et al. | |
| 7,346,609 B2 | 3/2008 | Chen et al. | |
| 7,453,377 B2 | 11/2008 | Lee et al. | |
| 7,529,752 B2 | 5/2009 | Hinshaw et al. | |
| 7,612,694 B1 | 11/2009 | Schneider | |
| 7,647,552 B2 | 1/2010 | Wan | |
| 7,652,596 B1 | 1/2010 | Sharma | |
| 7,991,811 B2 | 8/2011 | Carlson | |
| 8,065,337 B2 | 11/2011 | Furusho | |
| 8,108,355 B2 | 1/2012 | Zhang | |
| 8,108,361 B2 | 1/2012 | Netz | |
| 8,126,855 B2 | 2/2012 | Faerber et al. | |
| 8,719,322 B2 | 5/2014 | Bishop | |
| 8,918,363 B2 | 12/2014 | Naidu et al. | |
| 9,171,041 B1 * | 10/2015 | Narayanan | G06F 16/24561 |
| 9,350,384 B2 | 5/2016 | Ackerman et al. | |
| 9,356,621 B2 | 5/2016 | Ackerman et al. | |
| 9,361,464 B2 | 6/2016 | Wu | |
| 9,405,858 B2 | 8/2016 | Attaluri | |
| 9,449,046 B1 * | 9/2016 | Luszczak | G06F 16/24549 |
| 9,450,603 B2 | 9/2016 | Dickie | |
| 9,501,536 B1 | 11/2016 | El-Helw et al. | |
| 9,514,147 B2 | 12/2016 | Ackerman et al. | |
| 9,514,148 B2 | 12/2016 | Ackerman et al. | |
| 9,514,149 B2 | 12/2016 | Ackerman et al. | |
| 9,519,651 B2 | 12/2016 | Ackerman et al. | |
| 9,535,923 B2 | 1/2017 | Ackerman et al. | |
| 9,535,956 B2 | 1/2017 | Bellamkonda | |
| 9,608,664 B2 | 3/2017 | Dickie | |
| 9,614,543 B2 | 4/2017 | Dickie | |
| 9,628,107 B2 | 4/2017 | Dickie | |
| 9,798,727 B2 | 10/2017 | Dickie et al. | |
| 9,990,412 B2 | 6/2018 | Caufield et al. | |
| 2001/0031092 A1 | 10/2001 | Zeck | |
| 2001/0051941 A1 | 12/2001 | Tonomura | |
| 2002/0090141 A1 | 7/2002 | Kenyon et al. | |
| 2002/0101367 A1 * | 8/2002 | Geiger | H03M 7/30 341/51 |
| 2003/0028509 A1 | 2/2003 | Sah et al. | |
| 2003/0233347 A1 | 12/2003 | Weinberg | |
| 2004/0107189 A1 | 6/2004 | Burdick | |
| 2004/0199931 A1 * | 10/2004 | Kumar | G06F 7/02 725/19 |
| 2004/0264568 A1 * | 12/2004 | Florencio | H04N 19/63 375/240.12 |
| 2007/0064627 A1 | 3/2007 | Campos | |
| 2007/0115151 A1 | 5/2007 | Singh | |
| 2007/0143248 A1 * | 6/2007 | Uppala | G06F 17/30442 |
| 2007/0219951 A1 | 9/2007 | Ahmed et al. | |
| 2007/0257824 A1 | 11/2007 | Harada et al. | |
| 2007/0288526 A1 | 12/2007 | Mankad et al. | |
| 2008/0071818 A1 | 3/2008 | Apanowicz | |
| 2008/0189251 A1 | 8/2008 | Branscome et al. | |
| 2008/0270496 A1 | 10/2008 | Lundvall | |
| 2009/0006399 A1 | 1/2009 | Raman | |
| 2009/0112898 A1 * | 4/2009 | Tirpak | H03M 7/30 |
| 2009/0137701 A1 | 5/2009 | Hirabayashi | |
| 2009/0157701 A1 | 6/2009 | Lahiri et al. | |
| 2009/0171999 A1 * | 7/2009 | McColl | G06F 16/2465 |
| 2009/0210467 A1 | 8/2009 | Iorio | |
| 2010/0030796 A1 * | 2/2010 | Netz | G06F 16/24561 707/756 |
| 2010/0124381 A1 | 5/2010 | Bossen | |
| 2010/0153064 A1 | 7/2010 | Cormode et al. | |
| 2010/0278446 A1 * | 11/2010 | Ganesh | G06F 16/221 382/243 |
| 2010/0281079 A1 | 11/2010 | Marwah et al. | |
| 2010/0312801 A1 | 12/2010 | Ostrovsky et al. | |
| 2011/0099295 A1 | 4/2011 | Wegener | |
| 2011/0145308 A1 | 6/2011 | Duale | |
| 2011/0213775 A1 | 9/2011 | Franke et al. | |
| 2011/0219357 A1 | 9/2011 | Livshits | |
| 2011/0320446 A1 * | 12/2011 | Chakrabarti | G06F 16/90335 707/737 |
| 2012/0016901 A1 | 1/2012 | Agarwal et al. | |
| 2012/0054225 A1 * | 3/2012 | Marwah | G06F 16/2457 707/769 |
| 2012/0089579 A1 | 4/2012 | Ranade et al. | |
| 2012/0102056 A1 | 4/2012 | Guirard | |
| 2012/0109981 A1 | 5/2012 | Graefe | |
| 2012/0117076 A1 | 5/2012 | Austermann | |
| 2012/0319876 A1 * | 12/2012 | Froemmgen | H03M 7/4087 341/87 |
| 2012/0323929 A1 | 12/2012 | Kimura | |
| 2013/0018889 A1 | 1/2013 | Jagmohan et al. | |
| 2013/0036101 A1 | 2/2013 | Marwah | |
| 2013/0086353 A1 | 4/2013 | Colgrove et al. | |
| 2013/0099946 A1 | 4/2013 | Dickie et al. | |
| 2013/0124466 A1 | 5/2013 | Naidu et al. | |
| 2013/0124467 A1 | 5/2013 | Naidu et al. | |
| 2013/0166566 A1 * | 6/2013 | Lemke | G06F 16/24553 707/741 |
| 2013/0166568 A1 | 6/2013 | Binkert et al. | |
| 2013/0283398 A1 | 10/2013 | Wu | |
| 2014/0012922 A1 | 1/2014 | Wu | |
| 2014/0114926 A1 | 4/2014 | Anderson | |
| 2014/0114968 A1 | 4/2014 | Anderson | |
| 2014/0149367 A1 | 5/2014 | Benkstein et al. | |
| 2014/0258307 A1 | 9/2014 | West | |
| 2014/0304251 A1 | 10/2014 | Bornea et al. | |
| 2014/0324890 A1 | 10/2014 | Caufield et al. | |
| 2015/0066900 A1 | 3/2015 | Schneider | |
| 2015/0088830 A1 | 3/2015 | Kamp | |
| 2015/0188563 A1 | 7/2015 | Dickie | |
| 2015/0188564 A1 | 7/2015 | Dickie | |
| 2015/0193504 A1 | 7/2015 | Naidu et al. | |
| 2015/0220600 A1 | 8/2015 | Bellamkonda | |
| 2015/0278294 A1 * | 10/2015 | Varakin | G06F 16/2453 707/693 |
| 2015/0286465 A1 | 10/2015 | Dickie | |
| 2015/0288381 A1 | 10/2015 | Dickie | |
| 2015/0310051 A1 | 10/2015 | An et al. | |
| 2015/0347087 A1 | 12/2015 | Dickie et al. | |
| 2015/0370860 A1 | 12/2015 | Bender et al. | |
| 2016/0094242 A1 | 3/2016 | Ackerman et al. | |
| 2016/0094243 A1 | 3/2016 | Ackerman et al. | |
| 2016/0098420 A1 | 4/2016 | Dickie et al. | |
| 2016/0098439 A1 | 4/2016 | Dickie et al. | |
| 2016/0117343 A1 * | 4/2016 | Finlay | H03M 7/3088 707/693 |
| 2016/0147750 A1 | 5/2016 | Blanco et al. | |
| 2016/0154831 A1 | 6/2016 | Dickie | |
| 2016/0154835 A1 | 6/2016 | Dickie | |
| 2016/0196278 A1 | 7/2016 | Ackerman et al. | |
| 2016/0197622 A1 | 7/2016 | Ackerman et al. | |
| 2016/0204797 A1 | 7/2016 | Ackerman et al. | |
| 2016/0204798 A1 | 7/2016 | Ackerman et al. | |
| 2016/0204799 A1 | 7/2016 | Ackerman et al. | |
| 2016/0226512 A1 | 8/2016 | Dickie | |
| 2016/0246810 A1 | 8/2016 | Ackerman et al. | |
| 2016/0314055 A1 | 10/2016 | Bagchi | |
| 2017/0154075 A1 | 6/2017 | Anderson | |
| 2017/0315968 A1 | 11/2017 | Boucher | |
| 2017/0315978 A1 | 11/2017 | Boucher | |
| 2017/0315979 A1 | 11/2017 | Boucher | |

(56) References Cited

U.S. PATENT DOCUMENTS

FOREIGN PATENT DOCUMENTS

| KR | 1020110053737 A | 5/2011 |
|---|---|---|
| WO | 2008034213 | 3/2008 |
| WO | 2009058650 | 5/2009 |
| WO | 2013096620 | 6/2013 |

OTHER PUBLICATIONS

Dofactory. "SQL Select Distinct Statement". Nov. 13, 2014 snapshot via Archive.org. URL Link: <https://www.dofactory.com/sql/select-distinct>. Accessed Nov. 2018. (Year: 2014).*

Ho et al. "A Dictionary-based Compressed Pattern Matching Algorithm". Mar. 13, 2003 snapshot via Archive.org. <https://web.archive.org/web/20030313175423/http://cc.ee.ntu.edu.tw/~yen/papers/compsac2002.pdf>. Accessed Nov. 2018. (Year: 2003).*

O'Connell et al. "Performing Joins Without Decompression in a Compressed Database System". SIGMOD Record, vol. 32, No. 1, Mar. 2003. <https://dl.acm.org/citation.cfm?id=640991>. Accessed Nov. 2018. (Year: 2003).*

Tutorials Point. "Relational Algebra". Dec. 15, 2014 snapshot via Archive.org. URL Link: <https://www.tutorialspoint.com/dbms/relational_algebra.htm>. Accessed Nov. 2018. (Year: 2014).*

Zaiane. "The Relational Algebra". 1995. URL Link: <http://www.cs.sfu.ca/CourseCentral/354/zaiane/material/notes/Chapter3/node8.html#SECTION00121000000000000000>. Accessed Nov. 2018. (Year: 1995).*

TutorialsPoint. "Relational Algebra". Jan. 17, 2014 snapshot via Archive.org. URL Link: <https://www.tutorialspoint.com/dbms/relational_algebra.htm>. Accessed May 2019. (Year: 2014).*

W3 Schools. "SQL arithmetic function". Aug. 11, 2014 snapshot via Archive.org. URL Link: <https://www.w3resource.com/sql/arithmetic-functions/abs.php>. Accessed Oct. 2019. (Year: 2014).*

W3 Schools. "SQL Arithmetic Operators". Jan. 6, 2015 snapshot via Archive.org. URL Link: <https://www.w3resource.com/sql/arithmetic-operators/sql-arithmetic-operators.php>. Accessed Oct. 2019. (Year: 2015).*

TutorialsPoint. "SQL—Operators". Feb. 8, 2014 snapshot via Archive.org. URL Link: <https://www.tutorialspoint.com/sql/sql-operators.htm>. Accessed Oct. 2019. (Year: 2014).*

Moffat et al. Compression and Coding Algorithms. Springer Science & Business Media. Published Dec. 6, 2012. ISBN: 978-0792376682. Retrieved Jun. 2020. pp. 30. (Year: 2012).*

Salomon et al. Handbook of Data Compression, 5th ed. Springer-Verlag London Limited. Published 2010. DOI 10.1007/978-1-84882-903-9_3. Retrieved Jun. 2020. ch. 3. (Year: 2010).*

List of IBM Patents or Patent Applications Treated As Related, Apr. 20, 2016, 2 pages.

Baek, Seung Jun, et al; "Minimizing energy consumption in large-scale sensor networks through distributed data compression and hierarchical aggregation." Selected Areas in Communications, IEEE Journal on 22, No. 6 (2004): 1130-1140.

Yang, Dow-Yung, et al; "Compression of particle data from hierarchical approximate methods." ACM Transactions on Mathematical Software (TOMS) 27, No. 3 (2001): 317-339.

Wikepedia, "Charles Joseph Minard", Sep. 22, 2014, 4 pages.

Friedman, "Data Visualization: Modern Approaches", Smashing Magazine, Aug. 2, 2007, 29 pages.

Wiegand, "Google Analytics Flow Analysis—Early Insights", Analytics Review, Jan. 15, 2013, 6 pages.

IBM, "Information as service from Server Explorer in Microsoft Visual Studio .Net", IP.com, IPCOM000139374D, Aug. 22, 2006, 5 pages.

Raman et al., "DB2 with BLU Acceleration: So Much More than Just a Column Store", VLDB Endowment, vol. 6, No. 11, Copyright 2013, VLDB Endowment 2150-8097/13/09, 12 pages.

Justin Zobel and Alistair Moffat, "Inverted Files for Text Search Engines". ACM Computing Surveys, vol. 38, No. 2, Article 6 (Jul. 2006). DOI=10.1145/1132956.1132959 http://doi.acm.org/10.1145/1132956.1132959.

Jordi Nin, Anne Laurent, and Pascal Poncelet, "Speed up gradual rule mining from stream data! A B-Tree and OWA-based approach". J. Intell. Inf. Syst. 35, 3 (Dec. 2010), pp. 447-463. DOI=10.1007/s10844-009-0112-9 http://dx.doi.org/10.1007/s10844-009-0112-9.

J. M. Chambers, "Algorithm 410: Partial Sorting [M1]", CACM, vol. 14, Issue 5, May 1971, pp. 357-358.

William Pugh, "A Skip List Cookbook", UMIACS—TR-89-72.1, Jul. 1989, pp. 2-14.

Internet Society et al.; "A Negative Acknowledgment Mechanism for Signaling Compression"; An IP.com Prior Art Database Technical Disclosure; http://ip.com/IPCOM/000125196D; May 24, 2005.

Tagliasacchi, M. et al.; "Transform coder identification based on quantization footprints and lattice theory"; Department of Electronics and Information, Milano College, Milano Italy; Nov. 19, 2012.

Euclid, "Elements," Books 7 and 10, c. 300 BC; http://aleph0.clarku.edu/~djoyce/java/elements/toc.html.

"Capture and display of performance profile for dataflow graph", IPCOM000232481D, Nov. 11, 2013, 4 pages.

Microsoft, "Block-Based Floating Point Texture Compression", An IP.com Prior Art Database Technical Disclosure, http://ip.com/IPCOM/000167464D, Feb. 14, 2008. 9 pages.

IBM, "Practical Two-Cycle Forwarding Mechanism for Floating Point Units", An IP.com Prior Art Database Technical Disclosure, http://ip.com/IPCOM/000116162D, IBM Technical Disclosure Bulletin, vol. 38, No. 08, Aug. 1995, pp. 225-236.

Pool et al., "Lossless Compression of Variable-Precision Floating-Point Buffers on GPUs", ACM, copyright 2011, pp. 1-8.

Isenburg et al., "Lossless Compression of Floating-Point Geometry", copyright CAD Solutions Co., Ltd., CAD'04 Conference, 2004, pp. 1-7.

Steele Jr. et al., "How to Print Floating-Point Numbers Accurately", Proceedings of the ACM SIGPLAN'90 Conference, White Plains, NY, Jun. 1990, ACM 0-89791-364-7/90/0006/0112, pp. 112-126.

Loitsch, Florian, "Printing Floating-Point Numbers Quickly and Accurately with Integers", PLDI'10, Toronto, Ontario, Canada, Jun. 2010, ACM 978-1-4503-0019/10/06, 11 pages.

Isenburg et al., "Lossless Compression of Predicted Floating-Point Values", http://www.cs.unc.edu/~isenburg/lcpfpv/, accessed May 2013, 2 pages.

Isenburg et al., "Lossless Compression of Predicted Floating-Point Geometry", Jul. 10, 2004, pp. 1-13.

Lindstrom et al., "Fast and Efficient Compression of Floating-Point Data", IEEE Transactions on Visualization and Computer Graphics, vol. 12, No. 5, Sep./Oct. 2006, 6 pages.

Wolfram MathWorld, "Fundamental Theorem of Arithmetic", 2012, retrieved from https://web.archive.org/web/20120704180459/http://mathworld.wolfram.com/FundamentalTheoremofArithmetic.html.

Wikipedia.org, "Fundamental theorem of arithmetic", 2013, retrieved from https://en.wikipedia.org/w/index.php?title=Fundamental_theorem_of_arithmetic&oldid=574451066.

List of IBM Patents or Patent Applications Treated As Related, Feb. 2016, 2 pages.

De Moura, et al. "Direct Pattern Matching on Compressed Text", Proceedings of String Processing and Information Retrieval: A South American Symposium (Cat. No. 98EX207), Sep. 11, 1998, Santa Cruz de La Sierra, Boliva, 7 pages.

Ho, et al., "A Dictionary-based Compressed Pattern Matching Algorithm", Proceedings of the 26th Annual International Computer Software and Applications Conference (COMPSAC'02), Aug. 26-29, 2002, Oxford, UK, 6 pages.

O'Connell, et al., "Performing Joins without Decompression in a Compressed Database System", SIGMOD Record, vol. 32, No. 1, Mar. 2003, 6 pages.

\* cited by examiner

QUERY PREDICATE EVALUATION AND COMPUTATION FOR HIERARCHICALLY COMPRESSED DATA

CROSS-REFERENCE TO RELATED APPLICATIONS

This application is a continuation of U.S. patent application Ser. No. 14/630,813, entitled "QUERY PREDICATE EVALUATION AND COMPUTATION FOR HIERARCHICALLY COMPRESSED DATA" and filed Feb. 25, 2015, the disclosure of which is incorporated herein by reference in its entirety.

BACKGROUND

Present invention embodiments relate to query predicate evaluation and computation on hierarchically compressed data, and more specifically, to pushing query predicates through a compression hierarchy to reduce computation during predicate evaluation.

Good compression ratios are needed in order to maximize capacity of storage and caches as well as reduce the amount of data traffic (e.g., input/output (I/O)) during query evaluations on storage and data networks. Existing compression schemes generally require full decompression (either to a buffer or streaming) before the data may be operated on as part of the query evaluation. Central processing unit (CPU) time and memory bandwidth required for such decompression may be large and costly from a computational perspective.

SUMMARY

According to embodiments of the present invention, machines, systems, methods and computer program products for processing data are provided. Compressed data is received and a requested operation for uncompressed data is performed on the compressed data by determining an intermediate location in a compression hierarchy of compression nodes and applying the requested operation to the data at that intermediate location.

In some embodiments, compressed data may be represented using a hierarchy of compression nodes, wherein each compression node is associated with a compression operation to produce compressed data.

In other embodiments, one or more parameters associated with the operation, the requested operation, or data associated with the operation may be transformed to provide the plurality of parameters in a common type, relative to the compressed data.

These and other aspects, features and embodiments of the present invention will be understood with reference to the drawing figures and the detailed description herein, and will be realized by way of the various elements and combinations particularly pointed out in the appended claims. It is to be understood that both the foregoing general description and the following brief description of the drawings and detailed description are examples and explanatory of preferred embodiments of the invention, and are not restrictive of present invention embodiments, as claimed.

BRIEF DESCRIPTION OF THE SEVERAL VIEWS OF THE DRAWINGS

Generally, like reference numerals in the various figures are utilized to designate like components.

DETAILED DESCRIPTION

Figure 1:
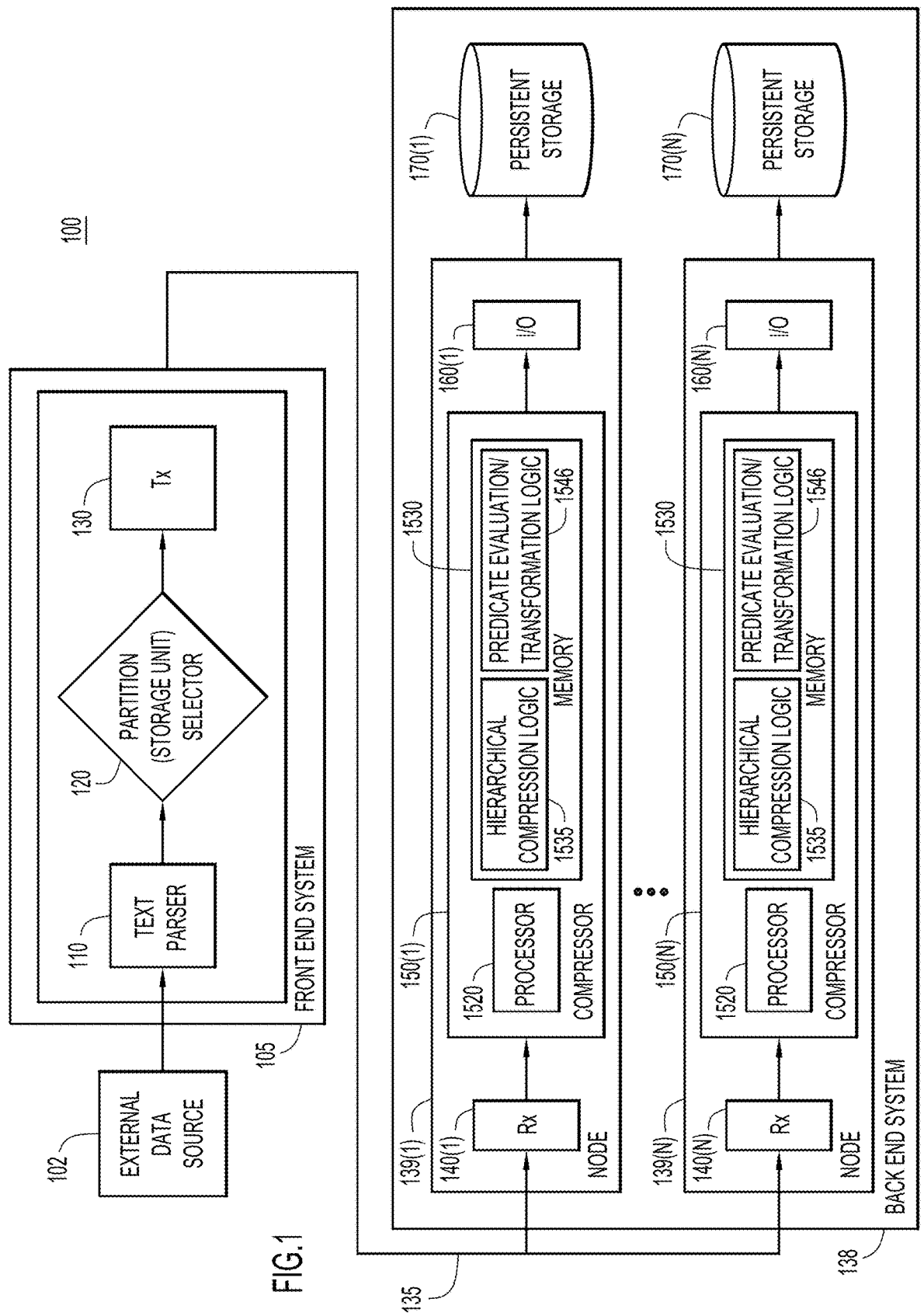
FIG. 1 is a diagrammatic illustration showing an example of a parallel database system in which information is compressed and stored and predicates are evaluated in accordance with an embodiment of the present invention.

Present invention embodiments push query predicate evaluation and associated parameters through a compression hierarchy to compute on hierarchically compressed data to reduce computation during query evaluation. This allows network capacity and bandwidth to be optimized as well as database performance to be accelerated, as fewer resources are needed to perform desired computations. Present invention embodiments allow calculations, e.g., comparisons, join processing, etc., to be performed without evaluating each value of compressed data. According to present invention embodiments, performed work may be reduced by performing computations on a subset of the total number of compressed values to obtain a desired result.

The compression schemes of present invention embodiments are used to represent values of at least three primitive types: integer, character, and double. Integer values may be high precision, e.g., 256 bit signed values. Character values may be fixed or variable-length byte strings, and double values may be binary 64 bit values. The compression techniques of present invention embodiments apply to each of these types of representations. Value types are not intended to be limited to integer, character and double data types, and may apply to additional value types as well.

Present invention embodiments also apply to additional data types including null values and structured database values. Null values, indicative of an unknown data value, may be handled by converting the null values to a different representation, e.g., an independent stream of Boolean values (e.g., 1-bit integers), to be compressed. Structured database types (time+timezone, interval) may be handled by converting the structured values to independent streams of integer values for each part of the data structure. In some embodiments, information correlating these transformed values or structures with the original values or structures, may be stored as well.

Present invention embodiments are also not limited to a particular representation of characters. For example, American Standard Code for Information Interchange (ASCII), Extended Binary Coded Decimal Interchange Code (EBCDIC), multi-byte representations of Unicode Transformation Formats such as UTF-8 or UTF-16, or any other suitable representation of characters may be used.

The techniques of present invention embodiments generally apply to, but are not intended to be limited to, parallel systems in which data is stored in columnar format (e.g., in which columns of a data table are stored across multiple databases or storage units or storage locations), which may include massively parallel systems. Databases or storage units may be local to or remote from each other. Storing data in columnar format may have significant advantages in terms of achieving a higher compression ratio (as compared to storing data in row format), as data is usually more structurally similar in columnar format and a higher compression ratio may be achieved. Accordingly, data is generally stored in compressed format, allowing fewer memory resources to be consumed for storage. Storing data in columnar format also has advantages in terms of data transport or I/O time, as only those columns which are of interest for a query are retrieved from storage.

During query evaluation, stored data in compressed format may be accessed from one or more storage units 170, and computations may be performed on the compressed data to obtain results of a query.

FIG. 1 shows an example of a parallel database system 100 in which data is being loaded into the system and stored. System 100 may be massively parallel. An external data source 102 comprises data that is to be stored in any of persistent storage units 170(1)-170(N). The data may be processed by a front end system 105, which may comprise a text parser 110, a partition or storage unit selector 120, and a network interface unit Tx 130 that transmits data over a high speed network 135 to nodes of a back end system 138. Partition or storage unit selector 120 may select one or more storage units 170 for storing incoming data, which is compressed prior to storage. Back end system 138 may comprise a series of blades or nodes 139(1)-139(N), each blade comprising a network interface unit Rx 140 for receiving data, a compressor 150 for compressing received data, and an I/O interface 160 for sending and receiving compressed data to persistent storage units 170. Compressor 150 also includes a processor 1520 and memory 1530. Memory 1530 may comprise hierarchical compression logic 1535 and predicate evaluation and transformation logic 1546. Compressor 150 may comprise one or more compression nodes, each node capable of compressing data according to a compression algorithm. Data may be compressed in a hierarchical (recursive) manner, such that compression is applied multiple times to a set of data, wherein the type of compression selected for a subsequent round of compression is influenced or determined by the type of compression selected for a preceding round of compression, and the data compressed in a subsequent round is all or a part of the output of a previous round of compression. Output data from compressor 150 may be in a compressed data structure format, and the compressed data structure format may be serialized or flattened into bits prior to being sent to storage via the I/O interface 160. Hierarchical compression operations performed at compression nodes are described in additional detail herein.

The system may comprise a plurality of blades, e.g., for a system containing N blades, the system may comprise network interfaces Rx 140(1)-140(N), compressor 150(1)-150(N), I/O interface 160(1)-160(N), and persistent storage unit 170(1)-170(N). The environment may include one or more blades/nodes 139, and one or more front end systems 105. The front end system 105 and the back end system 138 may be on the same server, or may be on separate servers, and may be implemented by any combination of software and/or hardware modules.

Blades/nodes 139 and front end system 105 may be remote from each other and communicate over a network 135. The network may be implemented by any number of any suitable communications media (e.g., wide area network (WAN), local area network (LAN), Internet, Intranet, etc.). Blades/nodes 139 and front end system 105 may be local to each other, and may communicate via any appropriate local communication medium (e.g., local area network (LAN), hardwire, wireless link, Intranet, etc.).

In this example, and as is common for many systems having a massively parallel architecture, data may be compressed according to present invention embodiments and stored in one or more persistent storage units in columnar format. For example, a table comprising many rows of data may be divided according to a scheme among the different storage units/blades. For example, the rows may be directed "round-robin" style to different blades (e.g., a row of data directed to each storage unit), or "round-robin" style in batches larger than a single row, or according to the values found in one or more columns of each row.

The column-oriented architectures and computational techniques of present invention embodiments operate on compressed data, minimizing the need to provide access to decompressed data. Additionally, in certain situations, computations do not require that the actual values of the data (or that each value in a set of data) be considered, which helps enable reduced or deferred computation on compressed data.

Figure 2:
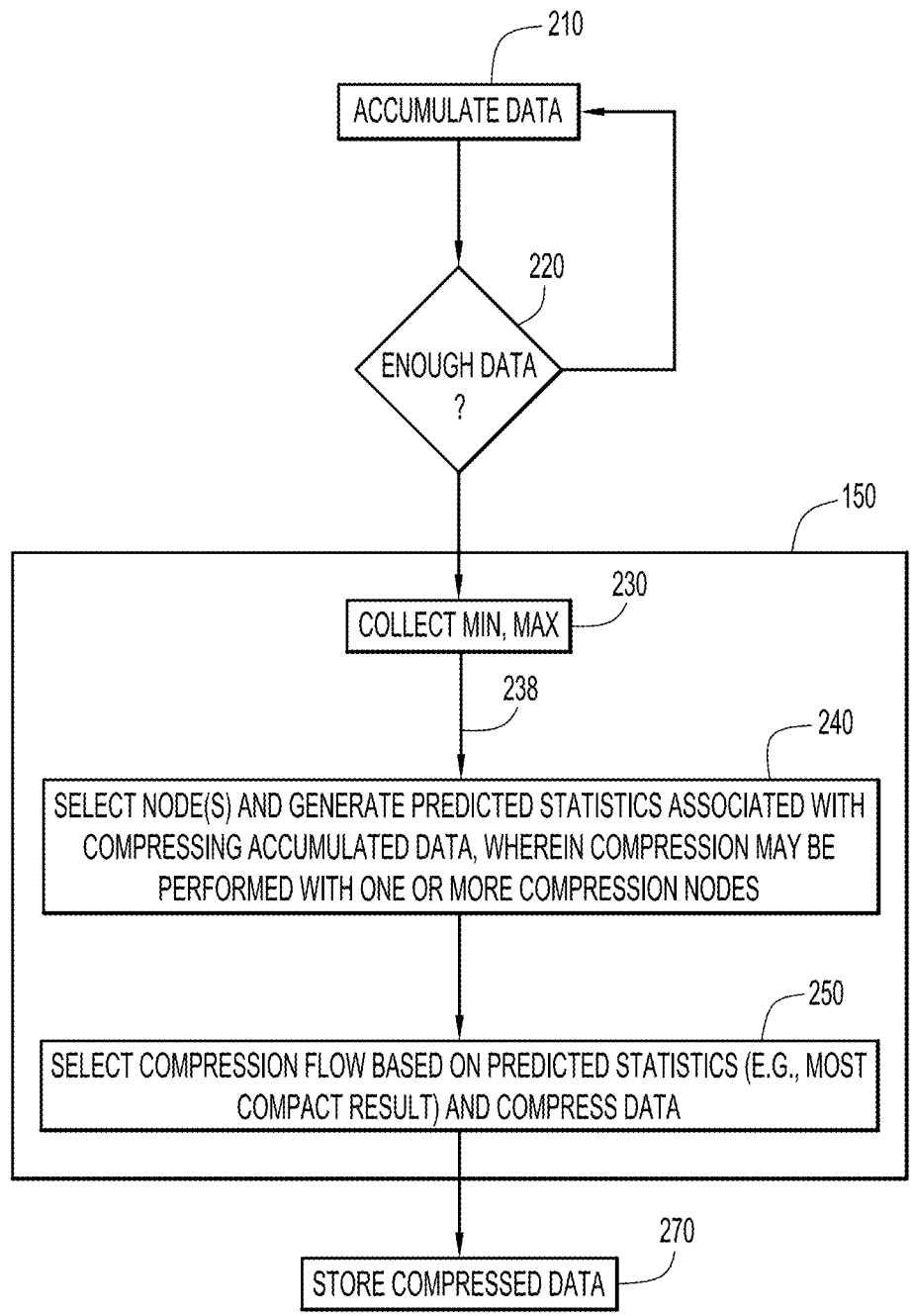
FIG. 2 is a procedural flow diagram of a manner of creating a hierarchy of compression nodes and selecting a compression flow in accordance with an embodiment of the present invention.

A manner of creating a hierarchy of compression nodes by compressor 150 in accordance with an embodiment of the present invention is illustrated in FIG. 2. At operation 210, data from an external data source 102 is accumulated. At operation 220, a determination is made as to whether a sufficient amount of data to be compressed has been collected. When sufficient data is present, the data is provided as input into compressor 150, where the data may be recursively and/or hierarchically compressed using a hierarchy of compression nodes.

At operation 230, the minimum value and the maximum value of the data to be compressed may be collected and stored. The minimum and maximum values may be used in conjunction with subsequent query processing to determine whether the corresponding compressed data is relevant to a particular evaluation (e.g., within a range of a specified parameter as part of a query evaluation, whether the data consists of constant values, etc.). For example, the minimum and maximum values may also be used with subsequent query processing to compute the result of an operation such as x>0; if the minimum value for a collection of data is 1, then the result of x>0 for every value in the collection is known to be "True", without looking at each value separately. At operation 240, statistics (e.g., predicted statistics) are collected regarding compressing accumulated data 238 with one or more compression operator(s)/compression node(s). These statistics are used to decide among compression schemes and are usually not retained. At operation 250, one or more compression operator(s)/node(s) are selected based on the results of operation 240 and desired compression goals (e.g., smallest size, shortest compression time, etc.), and the data is compressed. At operation 270, compressed data is stored in one or more storage units 170 (FIG. 1).

As a general example of compression, data may be provided as input into a first compression node, producing one or more compression parameters and zero or more collections of data (e.g., compressed data). These compression parameters and collections of data may later be provided as input to a corresponding decompression node to recover the original data values. As an example of hierarchical or recursive compression, these collections of data may each individually be provided as input to a second or subsequent compression node, which in turn may produce a second set of compression parameters and zero or more collections of data. The number of values and type(s) of values in each collection of data may differ from the number of values and type(s) of values in the original collection of data.

Figure 3:
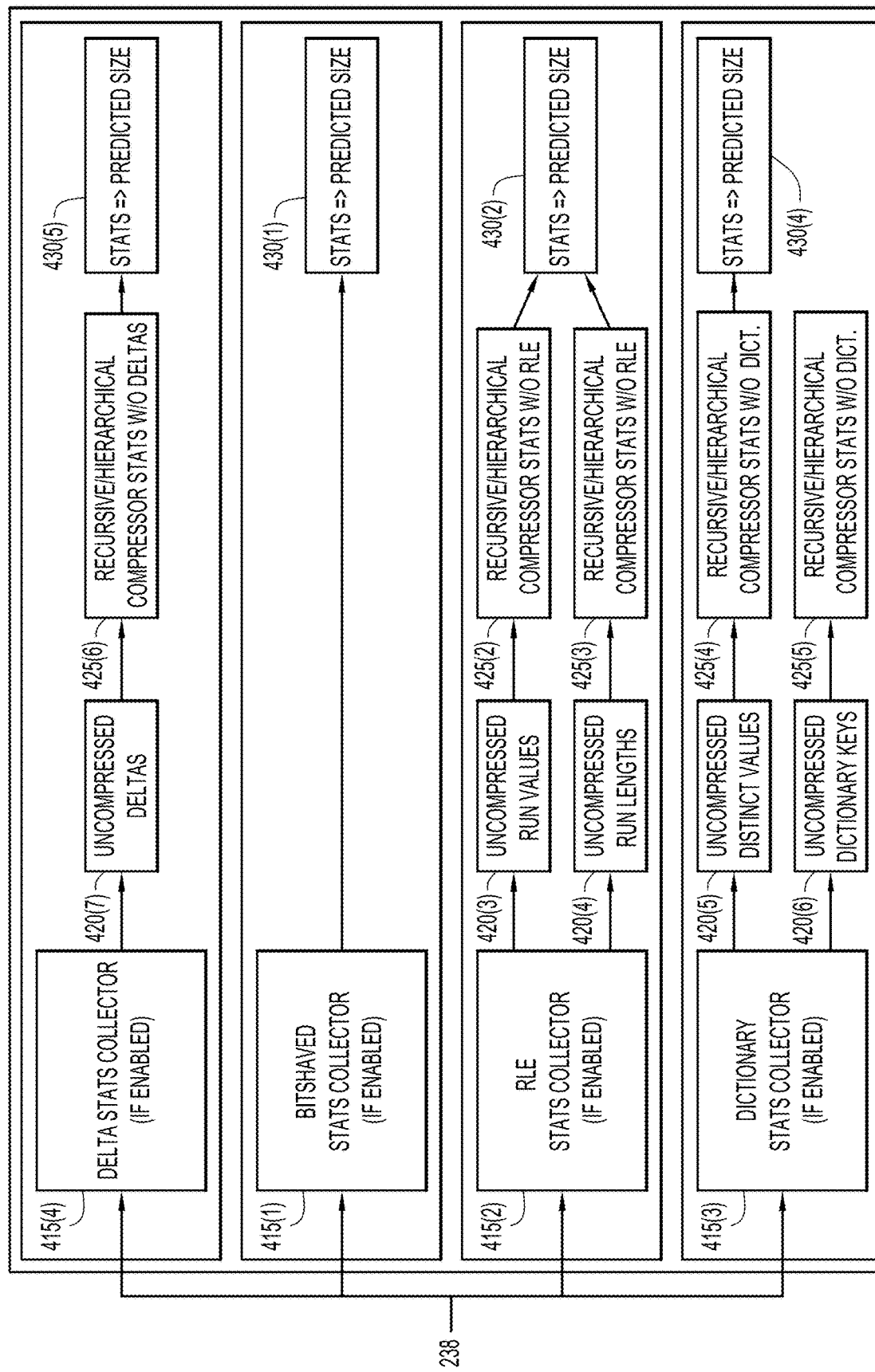
FIG. 3 is a procedural flow diagram of generating predicted compression statistics for hierarchical compression of data in accordance with an embodiment of the present invention.

Both operations 240 and 250 may utilize recursive operations. Operation 240 predicts the compressed size of the data by generating statistics associated with compressing the data. As shown in FIG. 3, for each enabled compression operator/node, data is fed into a statistics collector for that operator. The zero or more data outputs of the compression operator are each first produced during statistics gathering, and are fed recursively into another statistics collector 240 at operation 425, possibly with some compressors disabled. In general, the results of the recursive statistics collectors 425 and the parent statistics collector 415 are combined at statistics module 430 to predict the size of the compressed result. Generation of such statistics allows a path to be chosen, at operation 250, selecting which compressors will be used at each level of the compression hierarchy to produce the best result. At operation 270, the compressed data is stored in one or more storage units 170. Descriptions and examples of compression nodes are provided herein.

FIG. 3 shows an implementation of operation 240, showing computation of predicted compression statistics on the output (e.g., children) of various compression nodes. Compressor 150 (see, e.g., FIG. 1 and FIG. 6), may predict a compressed size and compute associated statistics (e.g., compression time, percentage of size reduction from compression, etc.) for uncompressed data. FIG. 3 provides an example workflow for computing such statistics recursively. These statistics may then be used to select one or more compression nodes for data compression during operation 250.

Uncompressed data 238 is fed into a statistics collector for each enabled compression node. For example, incoming data 238 may be directed to a delta compression statistics collector 415(4), a bitshaved compression statistics collector 415(1), a Run Length Encoding (RLE) compression statistics collector 415(2), a dictionary compression statistics collector 415(3), and so forth.

The compressor may be customized to selectively enable or disable compression nodes, depending upon the characteristics of the data. Fine tuning of the types of available compression nodes may accelerate the speed of the compressor. In some data sets, the type of data may be well characterized, e.g., from previous computations, and therefore, the types of compression which will be most efficient may be known. In such cases, certain types of compression may be disabled to accelerate compressor performance. For example, dictionary compression, which is typically computationally heavy, may be disabled for data in which such compression does not provide an appreciable benefit, or in contexts such as the compression of intermediate results where the expense of good compression may not be worth the time spent on dictionary compression.

In general, incoming data 238 is directed to a statistics collector 415 associated with a particular type of compression node. As data is provided to 240 in a streaming manner, data is provided to each of the nodes 415 in a streaming manner, one value at a time. The statistics collector 415 generates zero or more outputs 420 for a particular type of compression (it is noted that there is no uncompressed data output from the bitshaved statistics collector), and thus, nodes 415 perform much of the work associated with compression by computing outputs at 420, also in a streaming manner. The outputs are further evaluated at compression statistics collector 425 (invoking 240 recursively). Recursion will continue until terminating at a bitshaved compression node. Termination may also be forced by disabling other compression modes according to the depth of recursion, or according to which compression modes have been used at higher levels of the recursion.

Statistics are collected for each evaluated compression path at operation 430. Depending upon the order of applying various compression schemes, many different outputs, each output associated with a particular compression path or flow, may be generated for a given set of data. The statistics for each path may be compared to one another in order to determine an optimal compression flow for a given set of data, with the optimal compression flow used to govern compression at operation 250.

As mentioned previously, compression statistics collectors 425 may perform hierarchical/recursive statistics collection. The output streams at 420 are fed recursively into compression statistics collectors 425, which are modified versions of operation 240, one value at a time. In some embodiments, only bitshaved statistics collection is enabled and the statistics module 430 reports an absolute compressed size at 430(1). For example, the compressed size for bitshaved output may be reported as the number of values N times the number of bits per value B, plus the size of the base value V, plus a constant size C for storing the compression parameters (e.g., number of bits in base value, number of bits B, shift amount).

In other embodiments, as shown in FIG. 3, recursive/hierarchical compression at compression statistics collectors 425 may exclude the type of compression selected previously, from being selected subsequently. For example, for RLE encoding during compression at compressors 425(2) and 425(3), if the data has been previously compressed using RLE compression, then the compressor may be configured: (1) to exclude further RLE compression in cases in which applying the same mode of compression would not yield a further significant improvement in compression; and (2) to exclude certain types of compression which would not likely yield a further significant benefit when combined with a previously applied compression scheme, e.g., applying RLE to dictionary encoded data.

In still other embodiments, each of compression statistics collectors 425 invokes 240 with a particular compression mode removed from consideration. After one or more rounds of recursion have been applied, the set of compression modes is reduced to bitshaved and the recursion terminates.

In other embodiments, instead of excluding a particular compression mode during recursion, another criteria is utilized, e.g., a termination condition, etc. For example, the system may count the depth of recursion and disable all compression nodes except for bitshaved compression, in cases where the recursion depth has been determined to reach a specified threshold. At this level of termination, an absolute compressed size for bitshaved data has been computed, as noted above, and associated statistics with bitshaved data is returned. Accordingly, the recursive "parent" node receives a record or other indication stating that bitshaved compression was considered, and is predicted to produce data of a certain size.

More generally, at statistics module 430, several predicted sizes are considered, one for each compression scheme. The smallest predicted size or best compression scheme (e.g., by some other criterion, such as a bias to avoid delta compression) is selected, and only the statistics for the smallest predicted size and associated compression scheme are returned as the result from operation 240. For example, the data returned to the recursive parent will indicate that RLE should be used, with a certain size. This is received at node 425 in the parent. At statistics module 430 in the parent, the sizes of zero or more children are summed, along with compression parameters necessary for selecting this parent scheme, to produce a predicted size for the parent scheme. This recursive unwinding repeats until reaching the original call to the statistics module. The lower-level recursive steps (the "another compression node") may determine which of the higher-level compression nodes are used (the "first compression node" above).

As a further example, RLE statistics collector 415(2) may generate output types of run values 420(3) and run lengths 420(4). The RLE compressor processes a set of uncompressed inputs, and produces two uncompressed outputs as an intermediate result. An actual array of run lengths as convenient integers, and another conventional, uncompressed array of values are produced as outputs. The outputs are evaluated for further compression at statistics collectors 425(2) and 425(3) in which RLE is not considered. Upon determination of a most compact form for this pathway, statistics are generated for the predicted characteristics of the data at statistics module 430(2) and the predicted size is the total size of the RLE compressed data.

Similarly, dictionary statistics collector 415(3) may generate outputs of values 420(5) and keys 420(6). The outputs are fed into statistics collectors 425(4) and 425(5) to determine which recursive compression scheme will produce the best result. In some embodiments, the recursive/hierarchical compressor may include all types of compression nodes, such that the same type or different type of compression may be applied multiple times to a set of data. In other embodiments, some compression schemes may be excluded from further application based upon the type of compression selected for a set of data. For example, if the data has been previously compressed using dictionary compression, then the recursive compressor may be configured to exclude dictionary compression. In some embodiments, applying RLE compression to the dictionary values output 420(5) may be excluded because these values are known to be distinct values; RLE compression may still be enabled for the dictionary keys output 420(6), since the keys may include repeated data. Statistics are combined at operation 430(4). In a preferred embodiment, the dictionary "values" are generally always compressed using the bitshaved compressor if the data type is integer data, in order to make it easier to perform random access into the compressed dictionary when processing the data at a subsequent point in time. Otherwise, e.g., for varchar data, the dictionary is generally decompressed into a more convenient representation, e.g., an array of uncompressed values, when using the dictionary-compressed data at a subsequent point in time.

Likewise, delta statistics collector 415(4) may generate output types of uncompressed deltas at 420(7). The outputs may be evaluated at statistics collector 425(6) to determine which type of recursive compression should be applied. Statistics from 425(6) are combined with statistics from 415(4), e.g., a base output, at operation 430(5) to predict the resulting compressed size using delta compression.

Bitshaved statistics collector 415(1) generates no outputs for further consideration. The bitshaved statistics collected at 415(1) are sufficient to compute the predicted size of the compressed data at operation 430(1). Bitshaved is generally not subject to further compression.

The return result after recursive unwinding may be a structure indicating, e.g., that RLE should be used, with run values dictionary compressed, with dictionary keys bitshaved 5 bits each and dictionary values bitshaved 12 bits each, and (back at the RLE level) run lengths bitshaved at 3 bits each. Such a structure may look like: RLE(dictionary (bitshaved 12 bits, bitshaved 5 bits), bitshaved 3 bits).

As indicated above, the statistics computation is made for each compression node type, and indicates which nodes should be used for compressing data. The compressor then honors these decisions at operation 250 to produce a compressed structure that may be serialized to a sequence of bits, the final compressed form.

The outputs of multiple statistics collection nodes may be combined when determining total predicted compression size at 430. For example, for dictionary compression, then the predicted size may be determined based upon a combined predicted size of values and keys, plus the predicted size of the dictionary compression header.

Various compression nodes are understood to fall within the scope of present invention embodiments. Additional types of compression nodes, in addition to those shown in FIG. 3, are discussed herein. Descriptions and examples of different types of compression nodes are provided as follows.

Bitshaved compression, usually used as a terminus for every type of data compression, e.g., varchar data uses bitshaved for each character value, represents values as offsets relative to a base value, storing a base value of a sequence (e.g., a lowest value, minimum value, zero, etc.) and the difference between the base value and another value of the sequence. If the base value is the minimum value, all offsets will be positive, and no sign bit will be required per value. Offsets are preferably selected according to the minimum number of bits required for the largest offset. Although additional bits are allowed, minimizing the number of bits is preferred for on-disk storage.

Bitshaved representation also allows a scale factor to be applied to the offset. The scale factor may be a power of 2, a power of 10, or an arbitrary multiplicand. This is useful, e.g., regarding timestamp data, which often has many trailing zeros in a decimal representation.

For a sequence of input values which is constant, a bitshaved primitive compression node may be used to compress the sequence. For example, a sequence of input values: 2, 2, 2, 2, 2 may be encoded using bitshaved compression as bitshaved (base=2, scale=0, bits per value=0, bits=(0,0,0,0,0)).

For a sequence of input values differing by a variable amount, bitshaved compression may also be suitable for compressing the sequence. For example, a sequence of input values: 103, 98, 104, 97, and 98 may be encoded using a bitshaved primitive compression node as bitshaved (base=97, scale=0, bits per value=3, bits=(6,1,7,0,1)).

Another example of a compression node is RLE (Run Length Encoding). RLE is generally applied to a sequence of integers and has two children: a set of values and corresponding lengths. For each value, the number of times that the value repeats in a sequence is stored as length n. An example of applying RLE compression to the sequence of input values: 2, 2, 2, 3, 4, 4, 4, 5, 8, 8, 9 using a RLE compression node is rle(values=(2,3,4,5,8,9), lengths=(3,1,3,1,2,1)). Thus, because the value '2' repeats three times, a corresponding length of '3' is stored as well. Additionally, RLE usually produces an output sequence that is shorter than the input sequence (the sequence to be compressed), and only contains values appearing in the sequence. However during subsequent optimized processing, RLE encoded data may be produced that has some lengths=0, and thus, may have values which do not appear in the sequence being represented.

Another example of a compression node is dictionary encoding. Dictionary encoding also has two children: a set of values, usually distinct from each other, as well as a corresponding set of keys, which are indices into the values. Additionally, dictionary encoding usually produces a set of dictionary values that is smaller than the input sequence (the sequence to be compressed), and generally only contains values appearing in the sequence. For uncompressed input data, each of these aforementioned conditions will usually apply. During compression, the order of the dictionary entries may be arbitrary, and therefore, the entries may be sorted as indicated in a dictionary coding header, to improve compression of the values and simplify certain types of computations performed on the values. Dictionary compression may be applied to values of any type.

For example, a sequence of input values: "Y","Y","Y", "N","N", "Y","Y","Y","N" may be encoded using dictionary encoding compression as dict(sorted=ascending, values=("N","Y"), keys=(1,1,1,0,0,1,1,1,0)). In this example, "N" has a corresponding index of '0', and "Y" has a corresponding index of '1'. For values having lengthy character descriptions (e.g., city names, department names, etc.) a considerable benefit may be achieved with dictionary compression, as the resources needed to represent each value along with an associated index are much smaller than the resources needed to represent every full length occurrence of the value.

In some embodiments, the output of the dictionary encoding compression node may be further compressed, using other compression primitives, e.g., keys may be further compressed using bitshaving or RLE by operation 240.

Another example of a compression node is delta encoding compression node. Delta encoding may be used to compress a sequence of input values, usually numeric, e.g., sequence numbers or row identifiers. Delta encoding stores the first value of a series of input values as a base value and the difference between each pair of adjacent values.

Delta encoding compression may be used to compress a sequence of input values increasing by a constant amount. For example, a sequence of input values: 17, 19, 21, 23, 25 and 27 may be encoded using delta encoding compression as delta(base=17, deltas=(2,2,2,2,2)). In this example, the number '17' was selected as the base value, and the difference between the base value and the next value of '19', may be represented as '2'. Likewise, the difference between the value of '19' and the next successive value of '21' may also be represented as '2'. Once the deltas are compressed, this compression scheme utilizes fewer memory resources than the original sequence of input values.

As another example, for a sequence of input values increasing by a variable amount, a delta encoding compression node may also be suitable for compressing the sequence. For example, a sequence of input values: 100, 203, 301, 405, 502 and 600 may be encoded as delta (base=100, deltas=(103,98,104,97,98)). This scheme also utilizes fewer memory resources than the original sequence of input values once the deltas are compressed.

It should also be noted that this example utilizes a sequence which may be further compressed using bitshaved compression. As disclosed herein, compression primitives may be applied recursively/hierarchically, and thus, the output of a first compression node may be further compressed using the same or a second compression node. Sequence: 103, 98, 104, 97, 98 may be further compressed as bitshaved(base=97, scale=0, bits per value=3, bits=(6,1,7,0,1)).

Another example of a compression node is fixchar compression node. Fixchar compression, generally applied to a fixed byte representation of characters, converts each string value into an integer. Fixchar allows an integer representation of character values, including all-digit character values. Fixchar may be utilized when string lengths are constant and less than the supported maximum length of the integer, or may have an associated lengths child.

For example, a sequence of string input values: "A3Z1", "A3Z2", "A3Z9" may be encoded using fixchar compression. Each string is considered as a sequence of bytes in memory. This sequence of bytes is then interpreted as a base-256 integer. In some embodiments, conversion from character to integer values treats the character value as a "big endian" integer so that the resulting integers sort in the same order as the original strings under memory-order sorting. Another embodiment first converts the character value to a collation form for a specific lexicographic ordering locale, and then converts the collation form to an integer. Thus, "A3Z1", "A3Z2", "A3Z9" may be represented as fixchar (length=4, bits=(1093884465, 93884466, 93884473)).

It is noted that this sequence of integers may be further compressed using other compression nodes, e.g., bitshaved compression or delta compression, which may operate on integer data according to present invention embodiments.

Although not shown in this example, in other representations, such as 6-byte character values, character values may also include trailing spaces. In such a case, if all values have trailing spaces, then after conversion to integers, subtraction of the minimum integer value from the bitshaved data may cause trailing spaces to become trailing zero bytes, which are then compressed by applying a scale factor.

Yet another example of a compression node is the varchar compression node, which is typically also used to compress character data, and has two children, bytes and lengths. Individual characters are converted to an ASCII or equivalent representation and treated as 8-bit integers. Multi-byte characters may be handled by encoding as a sequence of smaller values (as in UTF-8 or UTF-16), with each set of smaller values treated as an integer, or compressed directly with each character value generally treated as a wider integer value. Varchar may have an associated lengths child to represent the length of the string, which may be variable. According to present invention embodiments, the integer representation as well as the lengths child (lengths of the character strings) may be further compressed using other compression nodes, e.g., bitshaved compression or other compression schemes such as Lempel-Ziv-Welch (LZW).

The double compression node, whose child contains the integer binary 64 representation of the double value, is similar to fixchar compression. The bits of a double value are either interpreted directly as a 64-bit integer to be compressed, e.g., by RLE, dictionary, or bitshaved compression, or are first converted to a collation form suitable for integer comparisons. A collation form for an IEEE-754 binary 32 or binary 64 floating point value may be obtained by the algorithm: if float>=0; then output=reinterpret float as integer; else output=minus(reinterpret minus(float) as integer).

Figure 4:
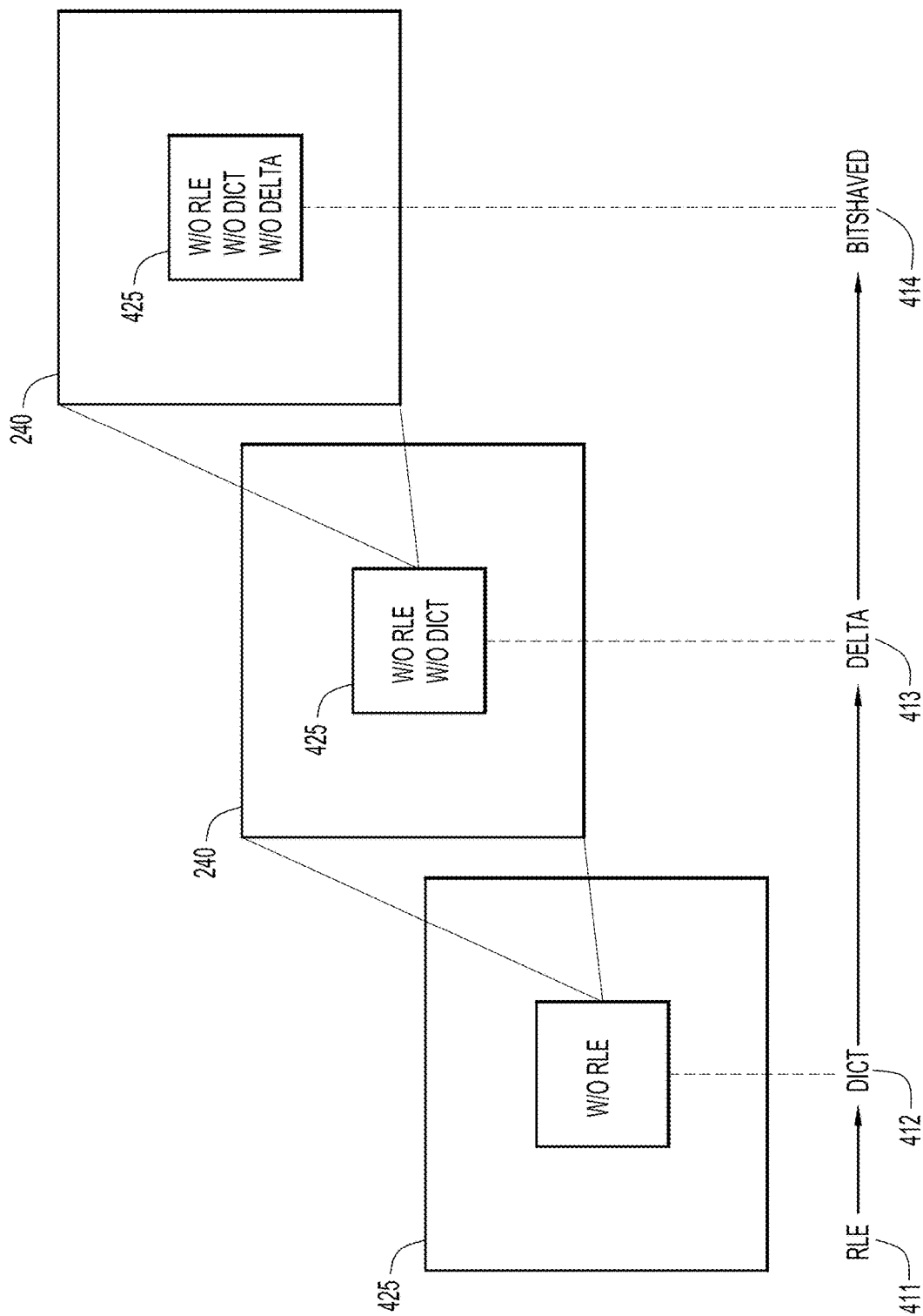
FIG. 4 is an example of recursively calling a compressor in accordance with an embodiment of the present invention.

FIG. 4 shows an example of recursively calling a compressor, according to present invention embodiments. At 411, a RLE statistics collector is initially selected at 415(2) (see, e.g., FIG. 3). At 412, recursive compressor 240 is called at 425 and dictionary compression is selected. At 413, recursive compressor 240 is called at 425, and delta compression is selected. At 414, recursive compression 240 is called at 425 and bitshaved compression is selected. Once bitshaved compression is selected, operations involving recursively calling 420 end.

Figure 5:
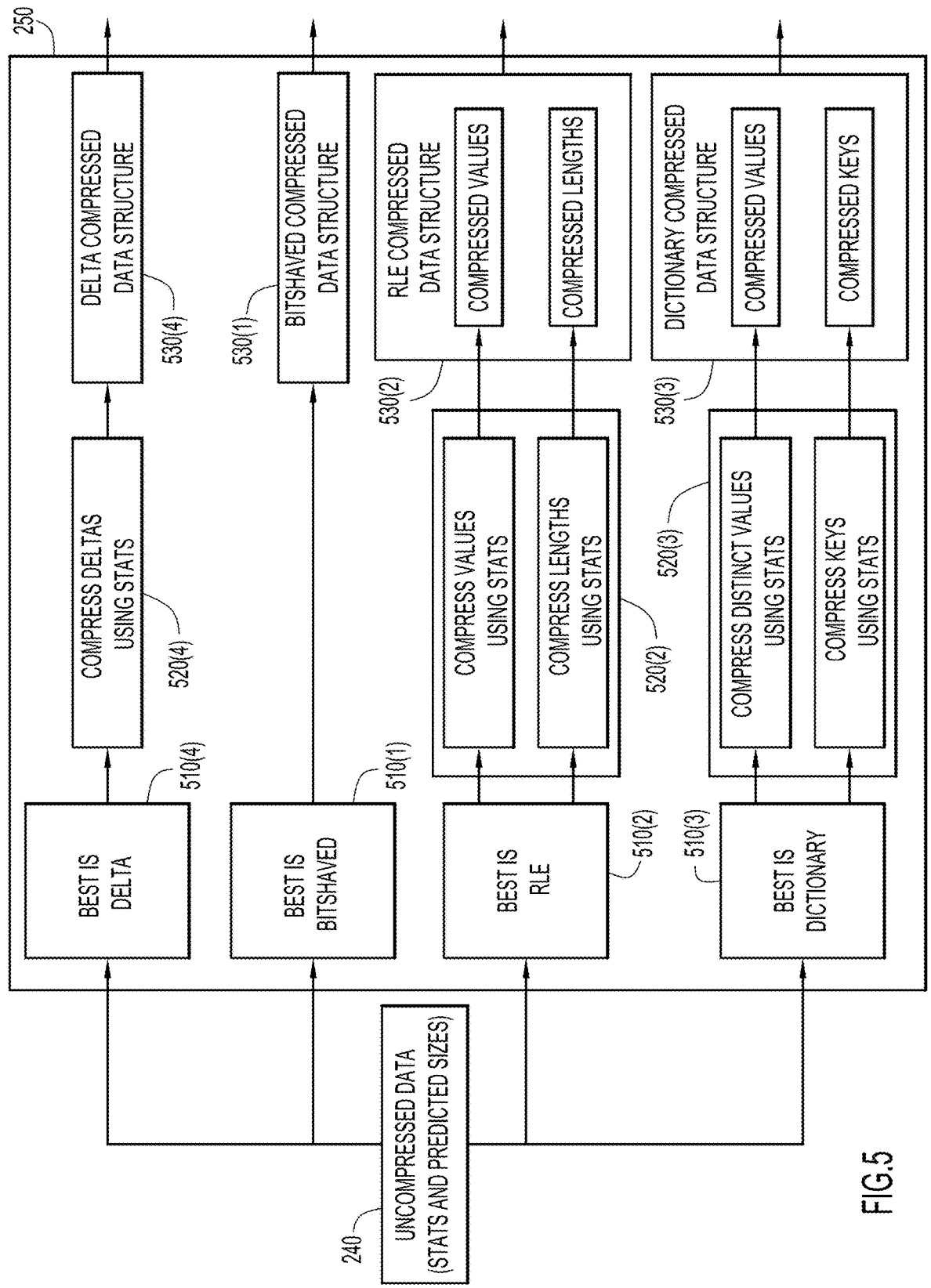
FIG. 5 is a procedural flow diagram showing how data may be compressed in a hierarchical manner, based on predicted statistical data, in accordance with an embodiment of the present invention.

FIG. 5 shows an example of a compression engine selecting a compression node for uncompressed data, based upon predicted compressed sizes and associated statistics or other specified criteria from operation 240. At operation 250, uncompressed data along with compression statistics and predicted sizes are provided to a compression engine. Based upon the predicted sizes and associated statistics, a compression node or compression flow comprising multiple compression nodes that best compress the data is selected. Depending on whether the data is integer, character, double, etc., some compression nodes will be more efficient at compressing a particular type of data than other types of compression nodes. For example, if the best type of compression is determined to be delta compression, then a delta compression node and associated compression flow will be selected at operation 510(4). If the best type of compression is determined to be bitshaved, then a bitshaved compression node and associated compression flow will be selected at operation 510(1), and so forth for a RLE flow at operation 510(2) and a dictionary flow at operation 510(3). It is noted that operations involving the bitshaved pathway are distinct from the remaining pathways. In general, the bitshaved data structure is produced by (1) subtracting the minimum value from each value, (2) either shifting by the number of bits determined by the bitwise statistics or scaling by the scale factor determined by the greatest-common-divisor of the differences between values, (3) encoding using only the number of bits necessary for the difference (e.g., maximum value−minimum value), and (4) packing these n-bit encoded values together in a bit array. In contrast, the other pathways include operations at 520, which are recursive compressor calls.

Again, it is understood that not all of the types of compression discussed herein are shown, but are understood to fall within the scope of present invention embodiments.

Once a compression node is selected, the data is processed according to a particular compression flow, as shown at operations 520(2)-520(4), in a hierarchical or recursive manner, and packaged into a data structure for storage at operations 530(1)-530(4).

As a more specific example, at operation 510(2), RLE is selected as an optimal compression flow and the uncompressed data is parsed into two output types: lengths and values. At operation 520(2), each data type (lengths and values) is compressed according to the selected optimal flow determined from associated statistics and predicted sizes by recursive invocations of operation 250, one invocation for each of lengths and values. At operation 530(2), the two sets of compressed data are packaged into a data structure that is the output of module 250. The other compression flows progress through a similar series of actions.

It is understood that present invention embodiments encompass not only the specific compression nodes described in reference to FIG. 5, but also, compression nodes associated with other types of compression as well.

The techniques presented herein do not restrict the order of the compression hierarchy. While the compressor may limit itself to certain hierarchies and depths, dynamically, at run-time, a representation may be obtained from a particular progression through a sequence of compression nodes, such as: RLE(RLE(RLE(fixchar(bitshaved),bitshaved),bitshaved),dictionary(bitshaved,bitshaved)).

The criterion for choosing the best encoding at 510 may be more complex than simple compressed size. For example, in some embodiments, a 'best' representation may be determined which penalizes certain compression modes, e.g., delta compression, which is computationally expensive, by providing a computational cutoff of computing a compressed result that is at least half the size of the next best alternative. In other embodiments, a compression scheme with fewer levels of recursion may be preferred or as long as this is within a factor of 1.01 (or some other factor) of the next best alternative.

Figure 6:
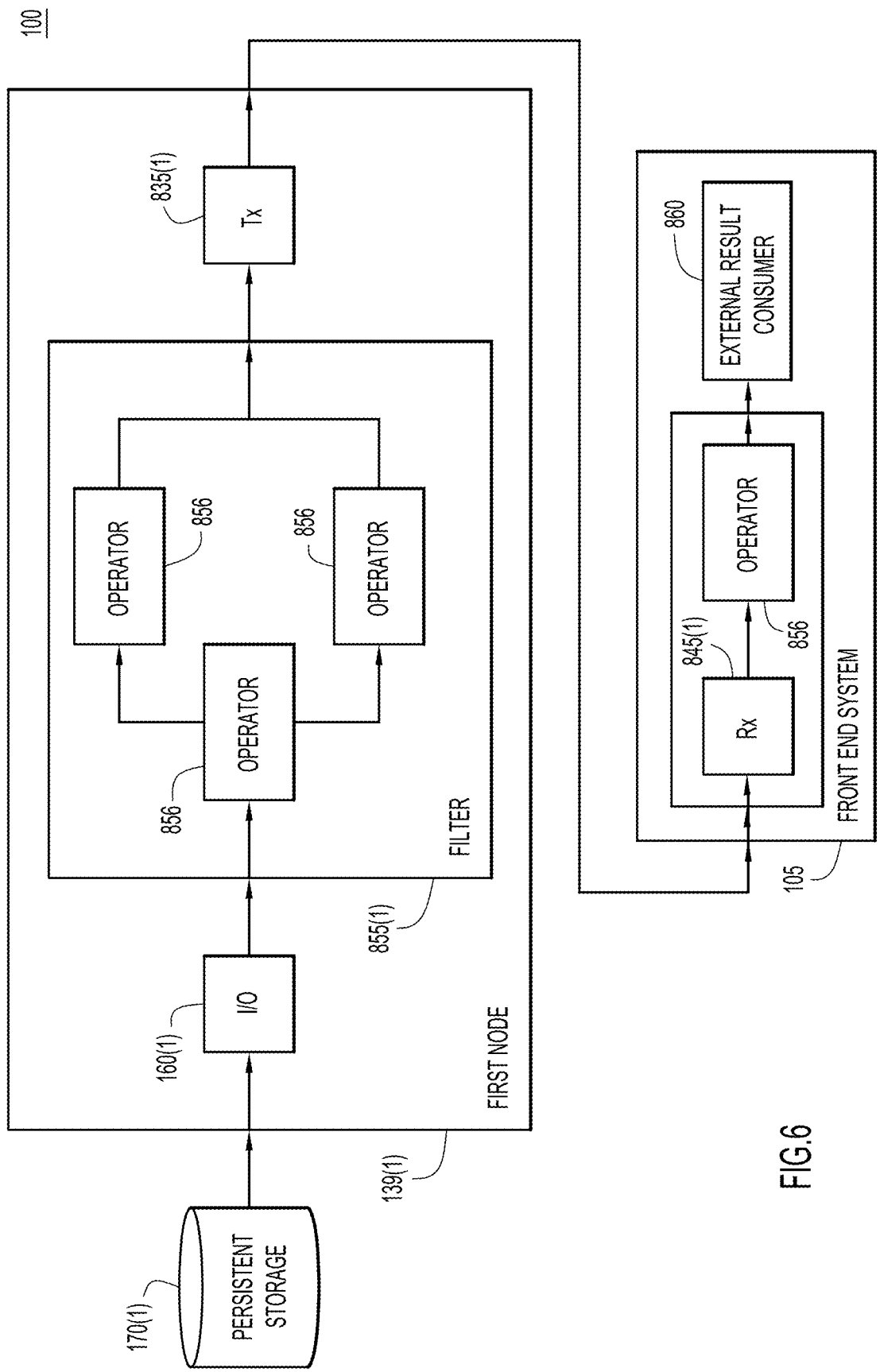
FIG. 6 is a diagrammatic illustration showing an example of a parallel database system in which compressed information is accessed during query processing in accordance with an embodiment of the present invention.

FIG. 6 shows an illustration of query processing to identify and extract data that has been stored in compressed format in one or more persistent storage unit(s) 170. Upon receiving query parameters from a user/host, the query is evaluated to identify and retrieve relevant data stored in compressed format in persistent storage unit 170(1). The flow of the data from the storage unit 170(1) through node 139(1) and the front end system 105 are shown. It is understood that multiple storage units as well as multiple nodes may be present. For simplicity, only one storage unit and node are shown.

Data from persistent storage unit 170(1) progresses through node 139(1), and in particular, through I/O module 160(1), filter module 855(1) and transmission module Tx 835(1) for transmitting data to front end system 105. Filter module 855(1) may contain one or more operators 856. A generic representation of operators 856 is shown at node 139(1) as well as the front end system 105. Operator 856 may contain hierarchical compression logic 1535 and predicate evaluation/transformation logic 1546. Front end system 105 comprises a receiving module Rx 845(1) for receiving data from node 139(1), an operator 856, and an external result consumer container 860 that is used to package information to be provided/displayed to a consumer. Although node 139(1) and front end system 105 could perform any operation associated with operator 856, in practice, operators which govern access to persistent storage will more likely be utilized on node 139(1) and operators governing returning data to an external consumer will more likely be utilized on front end system 105. Accordingly, operators may interact with data in a different manner on the front end and the back end.

Operator 856 may include many different types of functions, including but not limited to, decompressing data obtained from persistent storage, filtering decompressed data based upon query parameters, performing join or aggregation operations, performing comparisons, performing queries or transformations on compressed data (without first decompressing the data) and passing data relevant to a query to the front end system. Operator 856 may decompress data that has been stored in compressed format by any of the compression nodes according to present invention embodiments. Data 170(1) may be evaluated to determine data of relevance to the query, wherein the data is evaluated in compressed format. Once relevant data has been identified, the data may be filtered and provided to front end system/host 105 for display to a user. Decompression may occur at any point in this sequence, including immediately before display to the user. In general, decompression is deferred for as long as possible, in order to reduce the amount of computation required to manipulate and transport the data.

Figure 7:
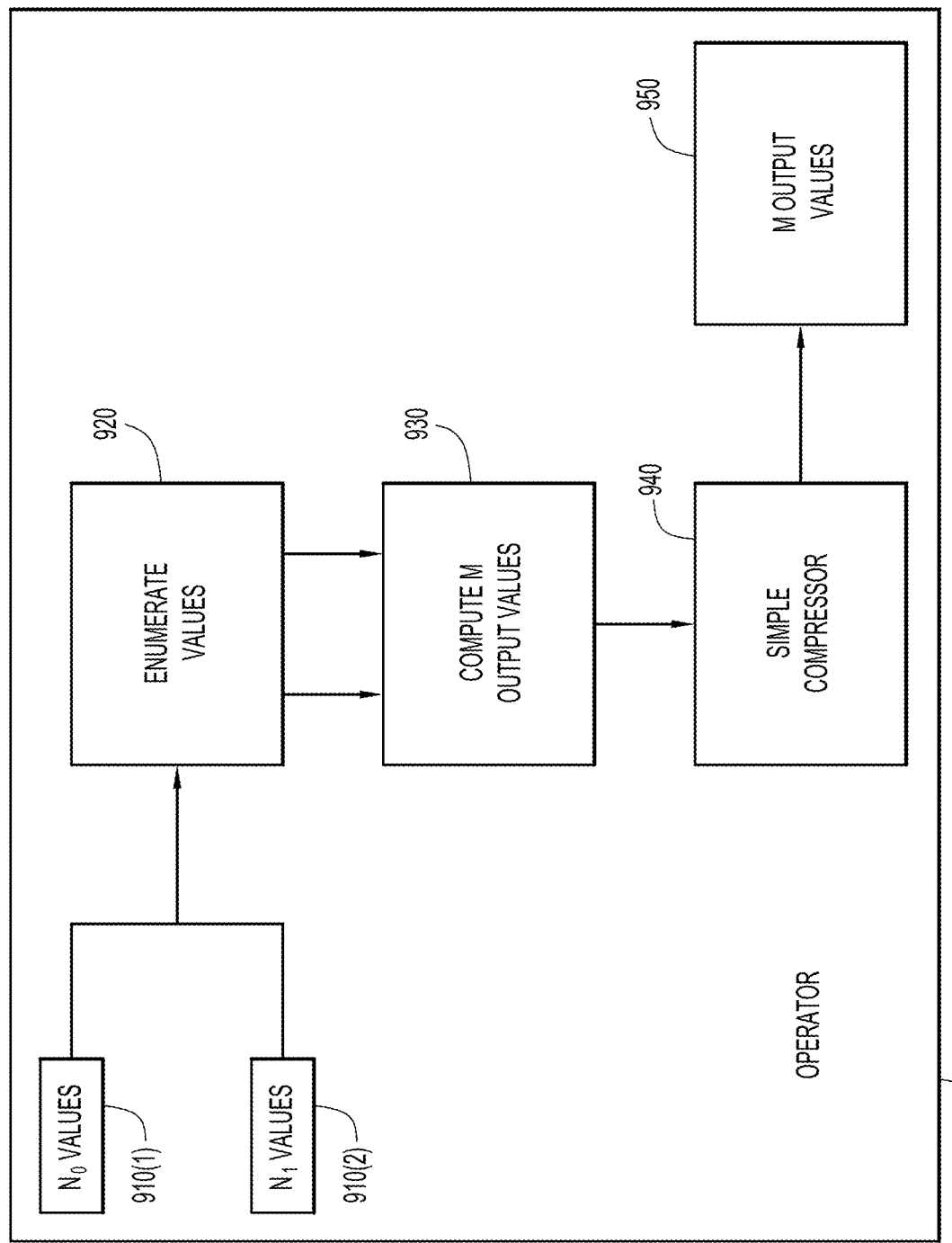
FIG. 7 is another diagrammatic illustration showing an operator in accordance with an embodiment of the present invention.

FIG. 7 shows a more detailed representation of an operator used for query processing in which data is first decompressed, operated upon, and then recompressed. This figure represents a conventional manner of performing computations on compressed data, specifically in that data is decompressed before it is operated upon. While present invention embodiments encompass optimized situations in which data is computed upon while still being in compressed format, in scenarios in which such optimizations to compute on compressed data may not be applicable, data may still be processed in response to query evaluation using the generalized operator structure of FIG. 7.

Inputs $N_0$ values 910(1) and $N_1$ values 910(2) represent inputs into an operator block 856, where $N_0$ and $N_1$ represent a number of values. These inputs include cases in which $N_0$ and $N_1$ are equal to one another as well as cases in which $N_0$ and $N_1$ are not equal to one another. At operation 920, input values still in compressed format are enumerated (or decompressed). At operation 930, computations are performed on the decompressed values, generating M output values in response to the query parameters. At operation 940, the output values are recompressed and provided as output (M output values) at operation 950. Enumeration generally indicates that all of the decompressed values may not be produced at once, and in particular, may not all be present in uncompressed form at the same time.

According to present invention embodiments, some operations, e.g., predicate evaluation, join processing, and operations that combine values from more than one column, etc., may be pushed down through the compression hierarchy to operate on compressed data. Data generally refers to one or more data values. Accordingly, present invention embodiments allow operations to be performed on compressed data, thereby reducing computational effort. Embodiments include operating on compressed data in a variety of compression formats, including but not limited to run-length encoded data, dictionary encoded data, as well as other types of data compression to which transformational coding, e.g., factoring out constant factors, re-casting of floating point values as fixed precision values, representing small character values as integers, or representing all-digit character values as integers, etc., may be applied.

Operations or simple computations may have no history from one row or value to the next, e.g., the result of the operation is not dependent upon the output of a previous computation. Such operations may be pushed down through a compression hierarchy of nodes, e.g., one or more of a RLE node, a dictionary node, a fixchar node, a double compression node, etc. Simple computations may include unary or binary operators.

In general, one or more input streams of data in uncompressed format may be received. The uncompressed data may be applied to one or more nodes of the compression hierarchy (e.g., FIGS. 1-5).

The compressed stream of data may be evaluated to determine the type of compression that has been applied to the data along with other characteristics of the compressed data. Based on the compressed format of the data, e.g., RLE, Dictionary Encoded, Fixchar, etc., as well as characteristics of the data (e.g., one or more constant inputs, etc.), and the type of requested operation, e.g., whether the requested operation evaluates data having a single variable, two variables, or more than two variables, a corresponding computational scheme may be selected, examples of which are provided throughout the specification. In other embodiments, the data may be transformed, and/or the requested operation and/or parameters associated with the operation may be transformed, in order to allow efficient computation of the operation on the compressed data. In general, compressed data comprises one or more data values and one or more corresponding parameters related to the type of compression applied. These embodiments are provided in additional detail throughout the specification, e.g., FIGS. 6-13.

Present invention embodiments are directed towards performing reduced computation as part of query predicate evaluation on compressed data for functions that involve unary, binary, or higher level operations. A function F may be applied to one or more inputs, which are in a compressed form, and present invention embodiments may be used to optimize computation on such data. In general, compressed streams of constant data require fewer computations than compressed streams of data with one variable, and compressed streams of data with one variable require fewer computations than compressed streams of data with two variables, and so forth. In addition, data with two variables, one of which is constant, may be operated upon using a unary function; data with three variables, with one constant variable, may be operated upon using a binary function; and so forth, to reduce computational workload. FIGS. 8-13 show example embodiments in which the characteristics of the data are determined, e.g., constant input, single variable, double variable, double variable with one constant input, multivariable, multivariable with one (or more) constant input(s), etc. An appropriate computation technique may then be selected based upon the characteristics of the data, as described throughout the specification and figures.

Additionally, present invention embodiments may apply to scalar arguments, as a separate representation is not needed for such arguments. For example, a scalar argument to an operation may be treated as a stream of data which has a constant value.

The following additional information is provided regarding compression types.

Let BITSHAVED(value_count, bits_per_value, <bits>) represent value_count unsigned integers, each represented using bits_per_value bits, packed into a dense data structure <bits>. For example, BITSHAVED(3, 1, 0b101) represents the sequence of values 1, 0, and 1. This is a primitive compression scheme upon which other schemes are built, according to embodiments of the present invention. This is the one and only primitive compression scheme in some embodiments of the present invention.

Let OFFSET(offset_value, <child>) represent the values in <child>, plus an integer value offset_value. For example, OFFSET(10,BITSHAVED(3, 1, 0b101)) represents the sequence of values 11, 10, 11. There exists a partial inverse function, OFFSETINV(offset_value, <value>) which represents <value> minus the integer value offset_value.

Let SCALE(scale_value, <child>) represent the values in <child>, multiplied by integer value scale_value. For example SCALE(1000, BITSHAVED(3, 1, 0b101)) represents the sequence of values 1000, 0, 1000. There exists a partial inverse function, SCALEINV(scale_value, <value>) which represents <value> divided by the scale value.

In some embodiments, the effects of BITSHAVED, OFFSET, and SCALE may be combined into a single compression node.

Let FLOAT(<child>) represent the integer values in <child>, with their bit-patterns re-interpreted as floating point numbers according to the IEEE 754 binary-64 floating point representation. There exists an inverse function, FLOATINV(<floatvalue>) which represents an integer value obtained by interpreting a floating point value as an integer.

Let FIXCHAR(length, <child>) represent the integer values in <child>, with their bit-patterns re-interpreted as bytes of character data, producing character strings of length <length>. There exists an inverse function, FIXCHARINV (length, <character value>) which gives the integer value obtained by interpreting the concatenated bytes of a character string as an integer.

Let RLE(<counts>, <values>) represent the sequence of values in <values>, with each value repeated the number of times specified in the corresponding position in <counts>.

Let DICT(<keys>, <values>) represent the sequence of values obtained from <values> by indexing using the keys in <keys> in order.

Figure 8:
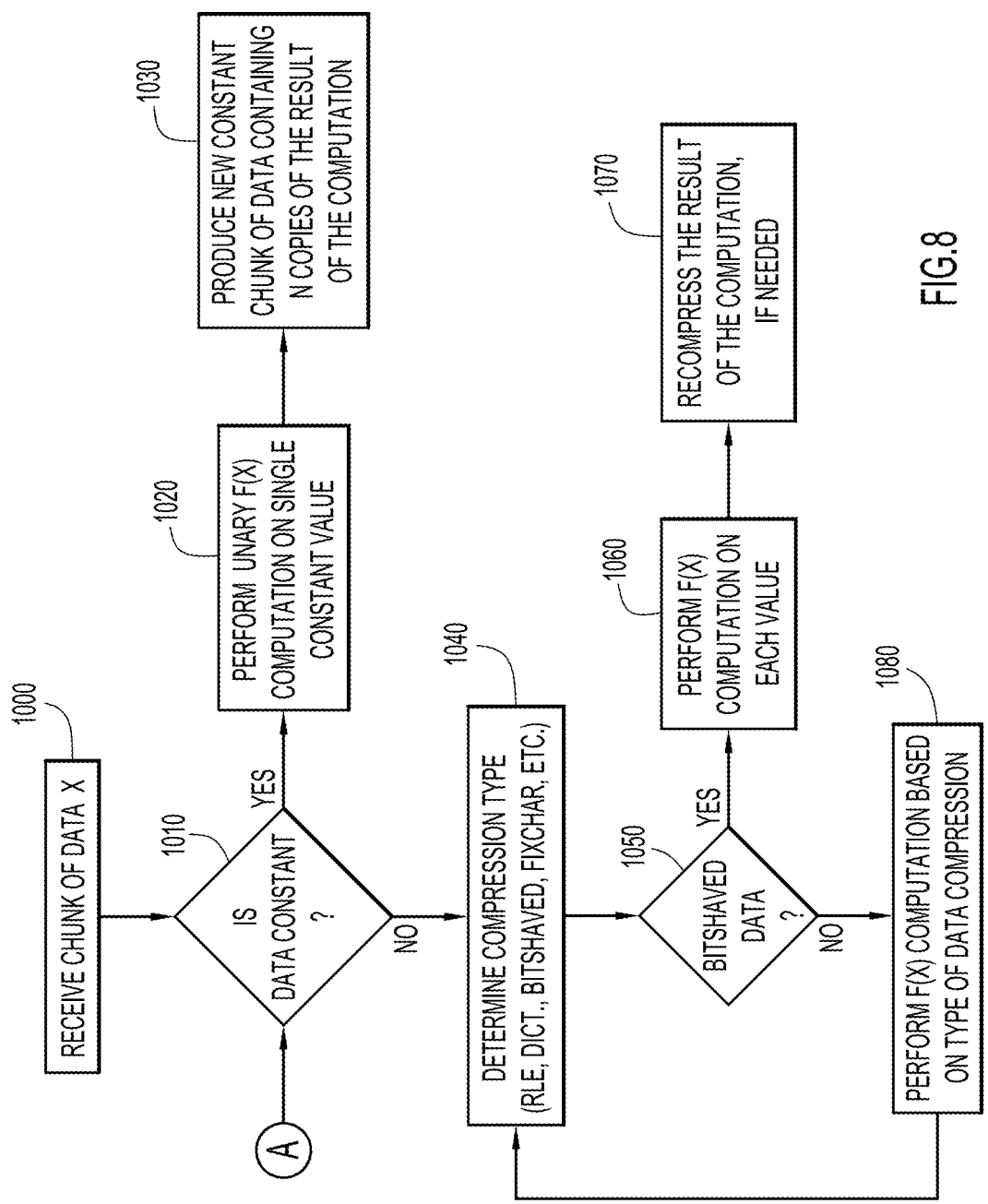
FIG. 8 is a procedural flow diagram showing an example of performing unary computations in accordance with an embodiment of the present invention.

FIG. 8 shows an example of a flow diagram for performing requested computations with unary functions, according to an embodiment of the present invention. Functions having a single argument, e.g., a function F(x) evaluating a single column, are referred to as unary operations. In such cases, the function F(x) may be pushed down through one or more nodes of a compression hierarchy as part of predicate evaluation or other operations.

A stream of data may be divided into chunks of values. The number of values in a chunk is usually somewhat large to enable efficient computation, e.g., 1000 or 4000 values. In other embodiments, a chunk may contain as few as 0 or 1 values or as many as 32000 values or more. Computational nodes with more than one input often consume a chunk of data from each input stream simultaneously, and these chunks are expected to contain the same number of values.

At operation 1000, a chunk of data with one argument X is received at a computational node, e.g., as part of evaluating a query predicate or performing a computation. In some embodiments, the received data will already be in a compressed format. A chunk of data may represent a unit of data provided to a processor for processing. For example, in a database, a table may be separated into zones containing some number of rows. For each zone, the columns may be separated into separate sequences of values. Each sequence of values may be represented according to an arbitrary combination of the operators described above. Values represented in this way are referred to as a chunk. When the table is read for processing, the chunks for a column form a stream of data. If multiple columns are read, then these form multiple streams of data with similar chunk boundaries.

At operation 1010, it is determined whether the received data is constant. If the data is constant, at operation 1020, a single value may be decoded and a unary computation F(X) may be performed on the single constant value of the chunk of data. A new constant chunk of data, which is the output of the unary function F(X), may be produced at operation 1030, by generating a determined number of copies (N) of the result of the computation performed at operation 1020.

Constant data may be readily identified by bounds, e.g., a minimum value and a maximum value, corresponding to a stream of data. For example, when the minimum value is the same as the maximum value, the data stream is recognized as comprising constant values. In some embodiments, data from the database may be selected in a manner such that each unit of streamed data has one or more constant values, in order to reduce computational workload. In other embodiments, a chunk may be identified as "constant", if it is a BITSHAVED chunk with bits_per_value=0, if the chunk is a FLOAT, SCALE, OFFSET, or FIXCHAR chunk whose <child> is constant, or if the chunk is a DICT or RLE chunk whose <values> child is constant.

Referring again to operation 1010, if the data is determined not to be constant, then at operation 1040, a compression type of the received data is determined, e.g., whether the data is RLE, dictionary compressed, fixchar compressed, bitshaved compressed, etc. At operation 1050, if the data is determined to be bitshaved compressed, unary computations based on function F(X) are performed on each value of data chunk X. If, at operation 1070, it is determined that the results of the computation performed at operation 1060 would benefit from recompression, the output data is recompressed according to the embodiments presented herein, e.g., FIGS. 2-5.

In some embodiments, if data has been compressed according to bitshaved compression, single instruction multiple data (SIMD) operations, which apply the same operation to a set of data, may be performed to reduce computations. For example, if two sets of data are to be added, the data may be processed using a single instruction to add the set of data, rather than issuing an addition instruction for each individual data value. A bitshaved representation allows fast SIMD operations on compressed values, without first decompressing the data.

Even when there is no discernible pattern in a sequence of values, these values may still fall within a limited range. For example, the prices of items in a database may not have any pattern from row to row, but may still fall within a limited range of prices, e.g., less than a particular value, which may be represented in bitshaved form, e.g., 16 bits per value. For SIMD computation, a SIMD add instruction with 16-bit words allows addition of up to 16 values in a single instruction, often completing in one cycle (pipelined).

Referring again to operation 1050, if the data is not in a bitshaved format, as determined at operation 1050, then at operation 1080, a unary computation F(X) is performed based on the type of data compression.

Depending upon the compression type, one or more of the following computations may be performed as part of operation 1080. For RLE-encoded data, F(X) may be applied to a chunk of data as follows: F(RLE(<counts>, <values>))=RLE(<counts>, F(<values>)). This computation involves re-using the data structure representing <counts>. Since the number of distinct values is likely less than the total number of values represented, this operation should be more efficient than operating directly on every value in order. As the values may be in any of the above formats, the application of F(X) may continue recursively.

For dictionary encoded data, F(X) may be applied to a chunk of data as follows: F(DICT(keys, values))=DICT (keys, F(values)). This is almost always an efficient operation, as the number of values in the dictionary is typically less than the number of values in the chunk—otherwise, dictionary compression would not have been chosen. Therefore, the number of computations performed is less than the number of values in the chunk.

For FIXCHAR-encoded data, F(X) may be applied to a chunk of data as follows: F(FIXCHAR(length, <child>))=FIXCHAR(length, [F*FIXCHARINV] (<child>)). Here the function is modified as computations are performed down the compression hierarchy, composing it with an inverse function. This same technique applies to FLOAT, SCALE, and OFFSET operators, especially when the <child> is in turn compressed according to RLE or DICT operators.

When F(X) is applied to a BITSHAVED chunk, the function is iterated over the individual values, applying F(X) to obtain new values, and then compressing the result back into the encoded format.

For example, if the data has been compressed according to a particular compression scheme, e.g., RLE, a dictionary encoded, etc., compression scheme, then at operation 1080, reduced computations may be performed (as compared to fully decompressing, performing the computations, and recompressing the resultant output data). For example, for data that has been pushed through a RLE node to compose the result RLE(lengths, F(values)), and through a dictionary node to compose the result Dictionary(keys, F(values)), etc., reduced computations may be performed.

In some embodiments, if a data chunk has been compressed according to RLE, and each value is unique, then a single F(X) computation may be performed per distinct value. In other embodiments, after applying RLE optimization, RLE(counts, F(values)), the result is RLE compressed, but may not be efficiently RLE compressed. If the resulting values are not all distinct, then the F(X) computation may proceed using these inefficiently-compressed values, or the data may be re-compressed to obtain a more efficient representation.

In other embodiments (not shown as part of FIG. 8), if the data stream is not in a compatible format for performing reduced computation, then the data may be recompressed according to present invention embodiments presented throughout the specification and figures, and the operations of FIG. 8 may then be applied. Otherwise, traditional evaluation techniques, e.g., decompression, performing computations, and performing recompression, may be applied.

Once operation 1080 completes, the process flow continues at operation 1040, and operations 1040, 1050 and 1080 are repeated until reaching data in bitshaved compressed form. For a unary function, the F(x) computation may be pushed all the way down through the compression hierarchy until reaching data in bitshaved form.

As an example, numeric input of 4,000 values may be reduced to 300 runs of repeating values by RLE. Thus, only 300 values need to be considered, instead of one for each of the 4000 values. In some instances, RLE compressed data may have a low number of distinct values and such data may likely benefit from further compression to further reduce the number of needed calculations. In general, the fewer number of bits needed to represent a value, the more likely that runs of repeating values are present, and thus, the likelihood of benefitting from additional compression increases.

Figure 9:
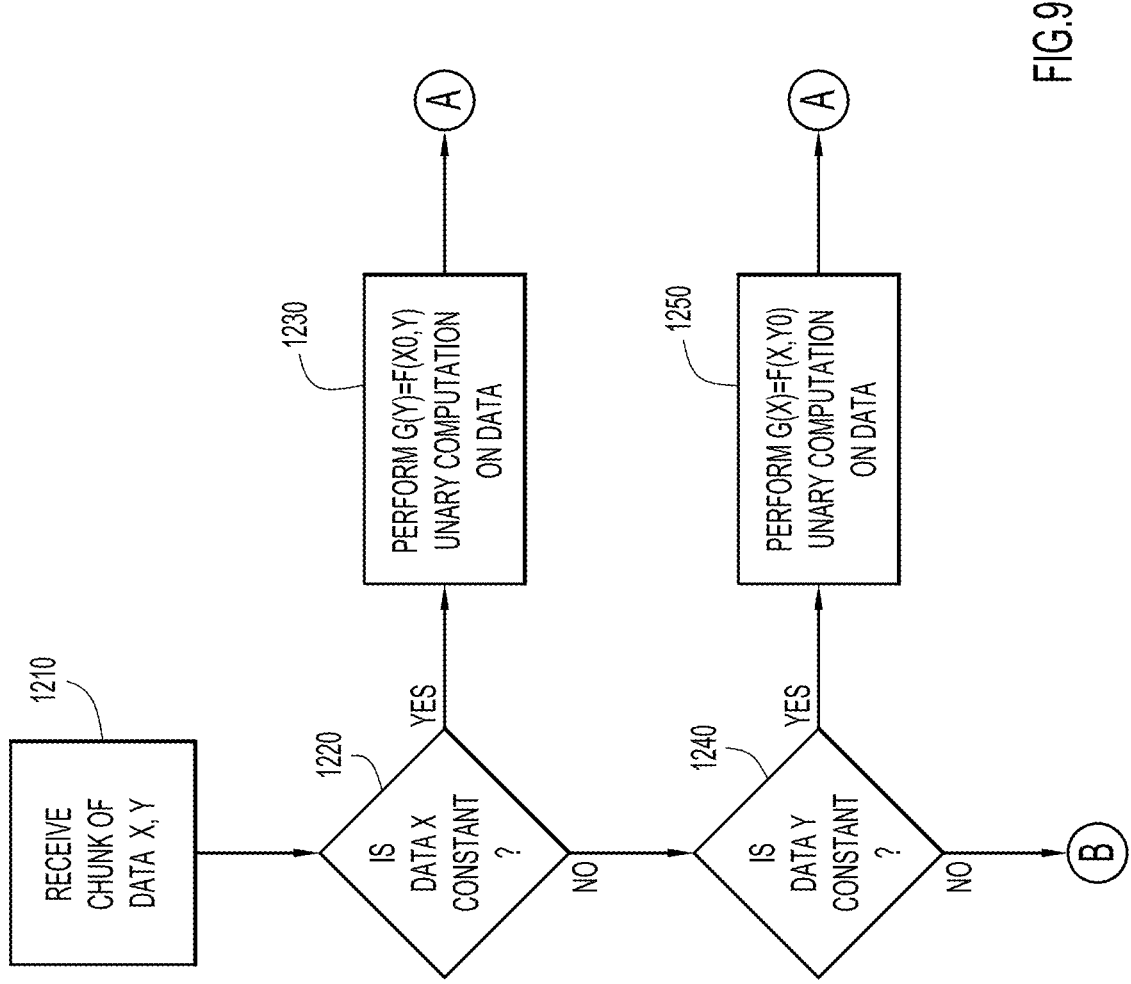
FIG. 9 is a procedural flow diagram showing an example of performing binary computations when one input is constant in accordance with an embodiment of the present invention.

FIG. 9 shows an example of a flow diagram for performing binary computations, when data chunk X or data chunk Y is constant, according to embodiments of the present invention. In general, binary operations may involve multiple variables, e.g., two variables, in which arguments for each data set are not locally constant. If arguments for data X or data Y are constant, then the data may be effectively treated as having a single variable, and unary computations, e.g., FIG. 8, may be applied. For two columns, one of which is constant, binary functions may be thought of as unary functions, by binding one of the arguments. For example, binding an argument y of a binary function F(X,Y) results in assigning a constant value to that argument to produce a unary function G(X). If the value Y is bound such that Y=2 in F(X,Y), then a function G(X) is produced which may be evaluated by computing G(X)=F(X,2). Such cases occur frequently in database processing, with examples including: (1) computing on multiple columns of data where one column of data is locally constant for that chunk of data, and (2) a user providing one or more constants as part of an expression to be evaluated.

In still other embodiments, this concept may be extended to higher level functions. If all inputs except for one column are constant, then the constant arguments may be bound to produce a unary function F(X) to be applied to the data, as the data essentially reduces to the simple case in which a single non-constant column is evaluated.

Referring to FIG. 9, at operation 1210, a chunk of data with two arguments X, Y is received. In some embodiments, the received data is in a compressed format, according to the techniques presented herein. At operation 1220, it is determined whether data X is constant. If data X is constant, at operation 1230, unary computations, e.g., G(Y)=F(X0,Y), where X0 represents that X is a constant, are performed. Accordingly, the process may continue according to FIG. 8, at 'A'.

If data X is determined not to be constant, then in a similar manner, at operation 1240, data Y is evaluated to determine if data Y is constant. If data Y is constant, unary computations e.g., G(X)=F(X,Y0), where Y0 represents that Y is a constant, are performed at operation 1250. Accordingly, the process may continue according to FIG. 8, at 'A'. Otherwise, the process continues at 'B,' an example embodiment is provided in FIGS. 10A-B.

Figure 10A:
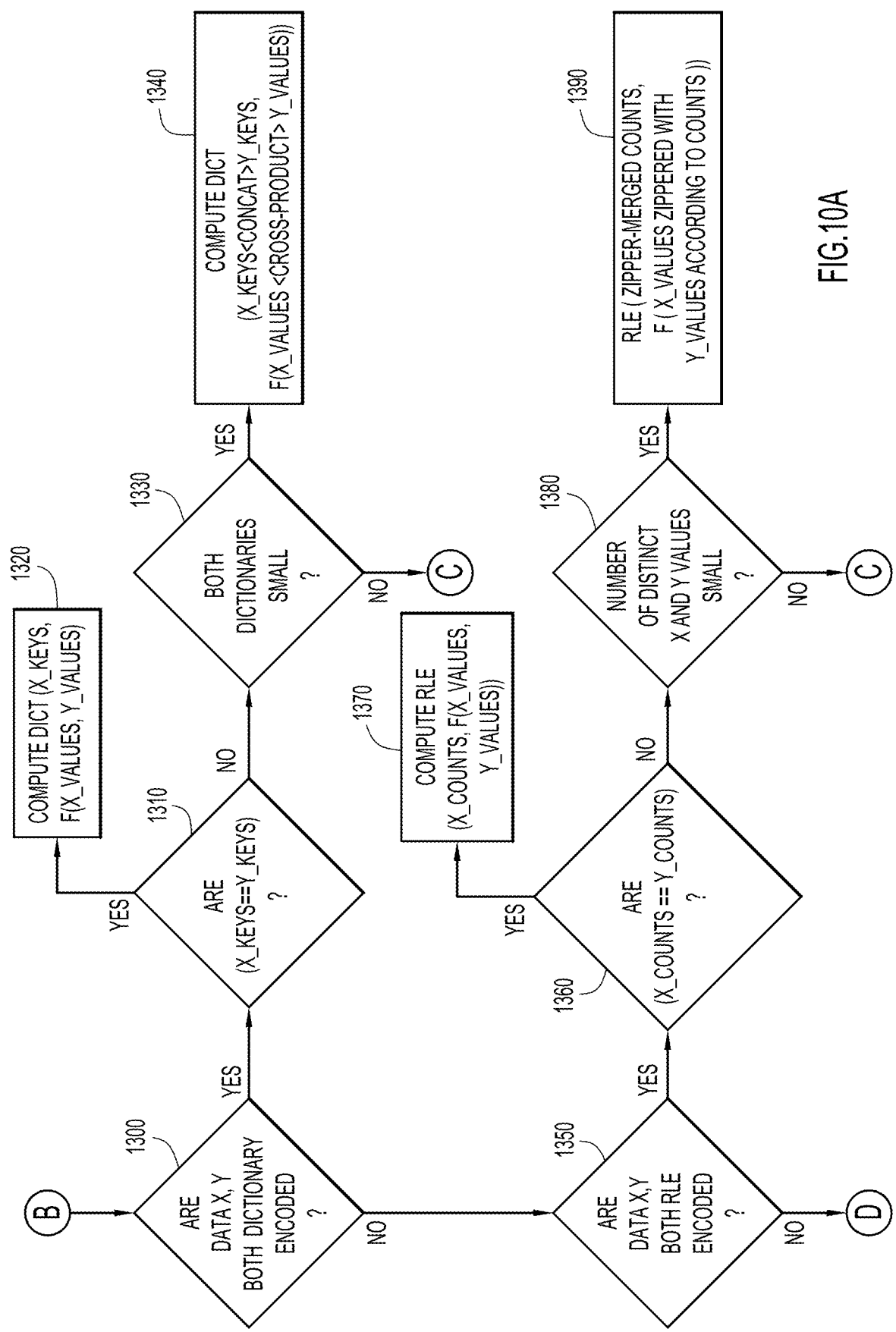
FIGS. 10A-10B is a procedural flow diagram showing another example of performing binary computations when both inputs are not constant, in accordance with an embodiment of the present invention.

If arguments for two or more columns are not constant (or not locally constant), then, in many cases, the number of computations may still be reduced, as shown at FIG. 10A at 'B', as compared to the case in which the data is decompressed, computed upon, and recompressed.

Figure 10B:
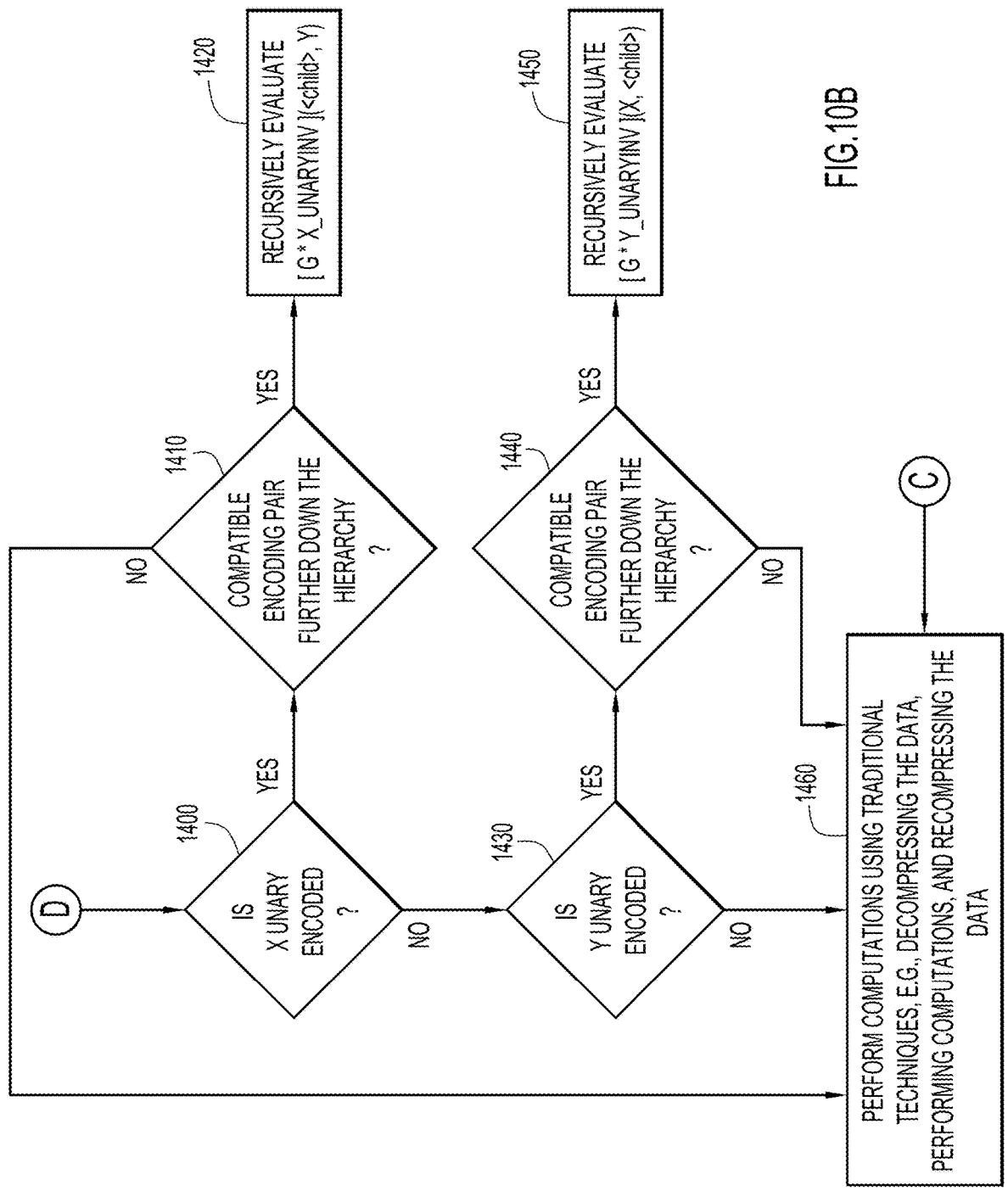

Referring to FIGS. 10A and 10B, an example flowchart for binary computations is shown in which neither data X nor data Y is constant. As previously noted, binary operations may involve two non-constant variables. At 'B', non-constant data X, Y is received (from FIG. 9). Depending upon the type of compression that has been applied to compressed data X, Y, additional computational techniques may be used to reduce computational cost. For example, if data X, Y is dictionary compressed or RLE encoded, then certain computational techniques may be applied to reduce computational cost associated with binary computations on dictionary or RLE compressed data.

At operation 1300, it is determined whether data X, Y are both dictionary encoded, e.g., chunks having X-keys, X-values, Y_keys, Y_values. Formats such as dictionary compression and RLE encoding allow reduced computations to be performed as part of a query predicate evaluation on compressed data. If data X, Y are both dictionary encoded, then at operation 1310, it is determined whether the dictionary keys associated with data X are equal to the dictionary keys associated with data Y, e.g., whether (X_keys==Y_keys), e.g., whether the dictionaries are the same objects (point to the same object in memory). If the set of keys are equivalent, then the process continues to operation 1320, in which the following computation is performed, e.g., DICT (X_keys, F(X_values, Y_values)). Similar to the unary case, the number of values in the dictionary is usually considerably less than the total number of values represented by the chunk, making this computation less expensive than the default computation. If the set of keys are not equivalent, at operation 1330, it is determined whether the dictionaries are small. For example, dictionaries may be regarded as being small if the cross product of the two dictionaries has a smaller size than the size of the corresponding chunk of data (so that dictionary compressed data is a reasonable choice for compression of the computed result). If the dictionaries are small, then at operation 1340, the following computation is performed, e.g., DICT (X_keys<concat>Y_keys, F(X_values <cross-product> Y_values)). This operation provides a benefit when the computation of F is more expensive than simple bitwise concatenation, e.g., when F is a string-related function or a user-provided function. One bitwise concatenation of key values per value and one evaluation of F per new dictionary entry is performed, which is fewer computations of F than the default calculation of decompressing, performing computations, and recompressing. Otherwise, the computation proceeds to 'C', as shown in the example embodiment provided at FIG. 10B, in which traditional computational techniques are performed.

If data X, Y is not dictionary encoded, then the process continues to operation 1350, where it is determined whether data X, Y are both RLE encoded, e.g., a data chunk having X_counts, X_values, Y_counts, Y_values. If data X, Y are both RLE encoded, the process continues to operation 1360, where it is determined whether the set of counts for data X, Y are equivalent, e.g., whether the counts are the same object (X_counts==Y_counts). If the counts are equivalent, then the process proceeds to operation 1370, in which the following computation is performed, e.g., RLE(X_counts, F(X_values, Y_values)). In this case, a computation benefit is achieved because the number of runs (and hence the size of X_values) in the chunk is usually considerably less than the total number of values represented, reducing the number of computations of F to be performed. Otherwise, if the counts are not equal, the process proceeds to operation 1380, where it is determined whether the number of distinct values for data X,Y are small. For example, the number of runs is considered small if the sum of the number of runs in X and the number of runs in Y is less than the total number of values represented, such that RLE encoding is a reasonable choice for compression of the computed result. If the number of distinct X and Y values are small, the process proceeds to operation 1390, in which zipper-merged counts are performed, e.g., RLE (zipper-merged counts, F (X_values zippered with Y_values according to counts)). Otherwise, the process continues to 'C' (see FIG. 10B). If data X, Y are neither dictionary nor RLE encoded, the process continues to 'D' (see FIG. 10B).

An example of a zipper-merged count is provided as follows. Two sets of counts are provided: X_counts and Y_counts. The run counts after a zipper merge are the combined set of boundaries. The counts may be represented on a number line as:

Compressed:
X_counts: 3, 9, 6,
Y_counts: 5, 4, 9,
Expanded:
X counts: 3, -, -, 9, -, -, -, -, -, -, -, -, 6, -, -, -, -, -
Y counts: 5, -, -, -, -, 4, -, -, -, 9, -, -, -, -, -, -, -, -
Combined:
Z_counts: 3, 2, 4, 3, 6,
Expanded
Z counts: 3, -, -, 2, -, 4, -, -, -, 3, -, -, 6, -, -, -, -, -

In the expanded version of Z_counts, there is a count in every position where there was a count for X or a count for Y. The number of counts is 5, not 6, because in the 0th position both X and Y have a count. For each of the resulting Z_counts, there must be one corresponding Z_value. This is computed as F(X,Y) where X comes from the X_values and Y comes from the Y_values, and each corresponds to this position in the number line. A particular X_value or Y_value may be used more than once. For example, in a data chunk representing 4000 values but with only 12 runs for X and 20 runs for Y, 4000 computations of F(X,Y) may be replaced with 32 or fewer computations of F(X), at the minor overhead expense of computing a zipper merge of 12 run lengths and 20 run lengths.

Referring to FIG. 10B, at operation 1400, it is determined whether data X is unary encoded, e.g., UNARY( . . . , <child>) encoding FIXCHAR, FLOAT, SCALE, OFFSET. In this example, unary coding represents a placeholder for all single-argument compression schemes, e.g., FIXCHAR, FLOAT, SCALE, OFFSET, etc., which are all examples of unary coding. If so, the process proceeds to operation 1410, where it is determined whether a compatible encoding pair is present further down the hierarchy. Compatible pairs are described throughout the specification which references two RLE encoded or DICT encoded chunks. A compatible pair may be identified by removing layers of unary coding on both X and Y until a compatible compression scheme is found. If the non-unary compression schemes are both RLE or both DICT then a compatible pair may be identified. If a compatible encoding is found, the process continues to operation 1420, and the following function is recursively evaluated, [G*X_UNARYINV](<child>, Y). This flow may occur in a recursive manner, returning to 'B'. Otherwise, the process proceeds to operation 1460, where computations are performed using traditional techniques, e.g., decompressing data, performing computations, and recompressing data.

If X is not unary encoded, at operation 1430, it is determined whether data Y is unary encoded, e.g., UNARY( . . . , <child>) encoding FIXCHAR, FLOAT, SCALE, OFFSET. If so, the process proceeds to operation 1440, where it is determined whether a compatible encoding pair is present further down the hierarchy. If a compatible encoding is found, the process continues to operation 1450, and the following function is recursively evaluated, e.g., evaluate [G*Y_UNARYINV](X, <child>) to determine whether <child> is encoded in a way which is compatible with the encoding of X. Otherwise, the process proceeds to operation 1460.

As discussed throughout the specification, finding the intersection of run lengths for compressed data reduces computations. For example, FIG. 10A (operations 1340 and 1390) are more computationally efficient than the fallback scheme at operation 1460.

In some embodiments, not shown as part of FIGS. 10A-10B, if the data is not in a suitable compressed format, a determination may be made as to whether the data may be recompressed into a more suitable format. If so, recompression is performed.

Figure 11A:
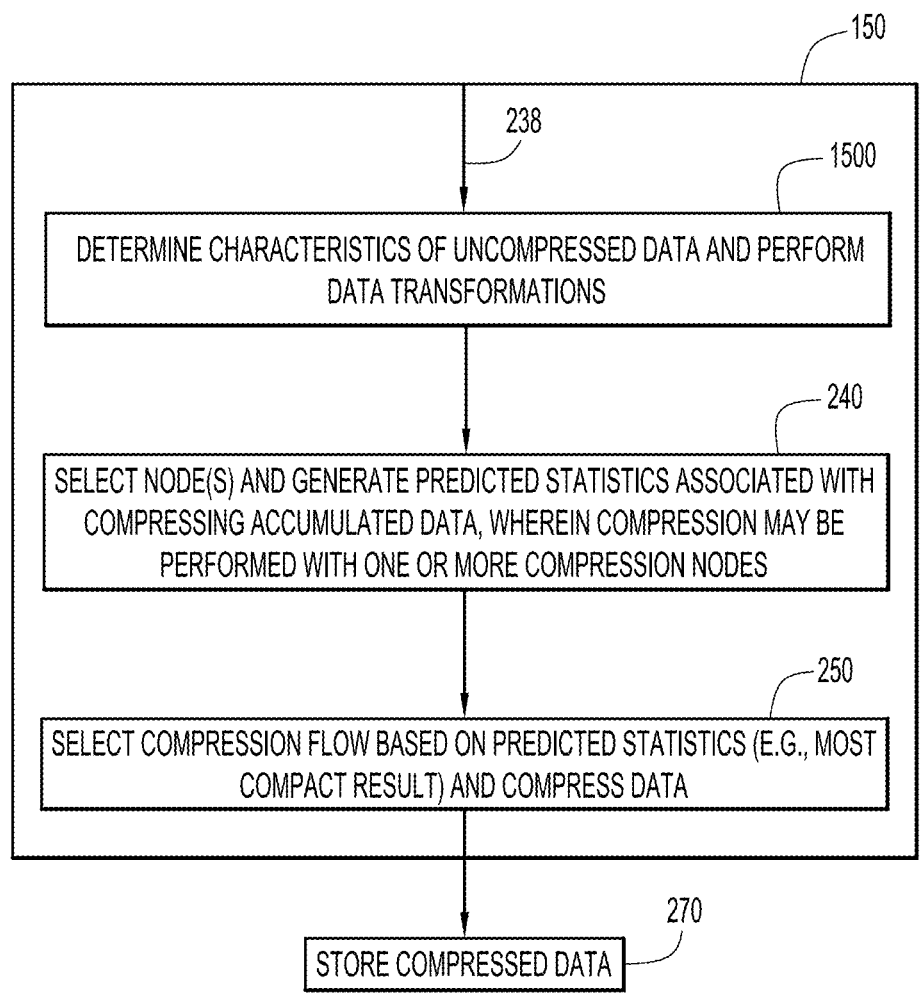
FIGS. 11A-11B are procedural flow diagrams showing examples of performing data transformations prior to data compression, in accordance with an embodiment of the present invention.
Figure 11B:
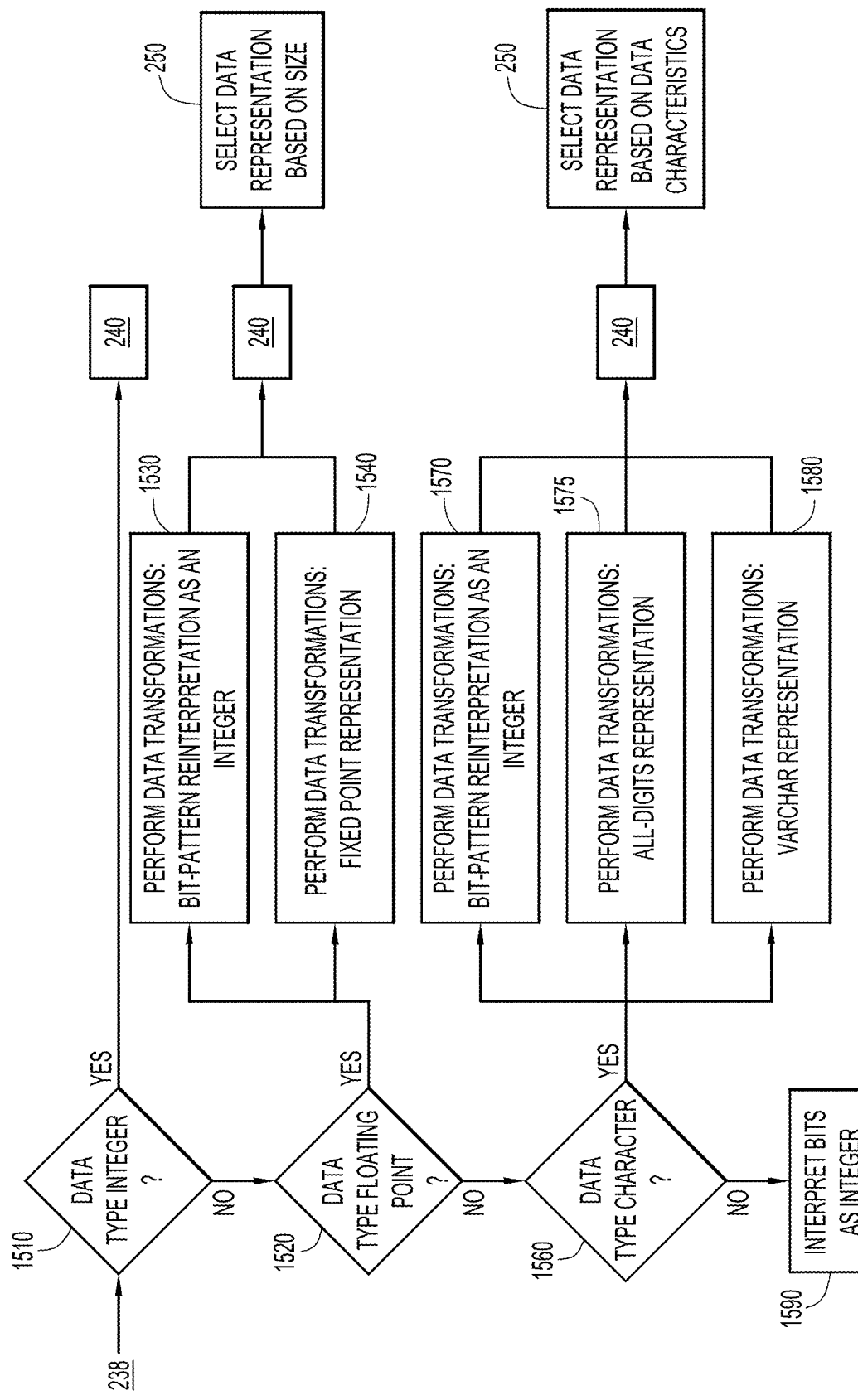

FIGS. 11A and 11B show example embodiments of performing data transformations, prior to applying the techniques shown in conjunction with FIGS. 8-10B. It is noted that these operations generally apply to incoming data that is in an uncompressed format. Accordingly, these figures show example embodiments of how various types of unary encoding schemes may be generated. FIG. 11A is similar to FIG. 2, however, a new operation (operation 1500) has been added with regard to data transformations. At operation 1500, the characteristics of the uncompressed data are determined, and based upon the determined characteristics, data transformations are performed on the data. An example embodiment of operation 1500, in additional detail, is provided in FIG. 11B.

FIG. 11B shows an example embodiment of performing data transformations prior to applying the computational techniques presented herein. In some embodiments, it will be advantageous to transform data into an alternate representation in order to achieve reduced computation.

At operation 1510, input data 238 is evaluated to determine if the data type is integer. If so, the process continues at operation 240. A bitshaved compressor may be employed for further computation in this case. If not, the process evaluates data 238 to determine whether the data type is floating point or character. At operation 1520, input data 238 is evaluated to determine if the data type is floating point. If so, the process continues at operations 1530 and 1540, where different transformations are applied to the data, and a data representation is then selected based upon the results of the transformation. At operation 1530, the data is reinterpreted as an integer (usually a default representation), and at operation 1540, the data is transformed into a fixed point representation. The results are then fed into operation 240. At operation 250, a data representation is selected based upon a size of the compressed data.

Otherwise, data 238 is evaluated to determine if it is of character type at operation 1560. If the data is character type, the process continues at operations 1570, 1575 and 1580, and a data representation is selected based upon the results of the transformation. At operation 1570, the data is reinterpreted as an integer (suitable when strings are short, e.g., less than or equal to 8 characters); at operation 1575, the data is transformed into an all-digits representation (suitable when parsing integers out of a string); and at operation 1580, the data is transformed into a varchar representation. Lengths may be treated as integers. A string of bytes of all strings may be represented as 8-bit integers. The results are then fed into operation 240. At operation 250, a data representation is selected based upon a size of the compressed data. If the data type is not floating point or character, then at operation 1590, bits are interpreted as integer type.

These transformations serve to reduce code complexity for the implementation of lower-level compression code. Rather than implementing code which distinguishes between integer, floating point, and character data as three different data types, the code simply needs to be able to identify integers, which are subject to bitshaved compression as the primitive compression operation. To handle floating point and character type data, transformations are performed to transform these data types into an integer representation. Benefits of operation 1530 include code simplicity and reversibility. For example, operation 1530 allows good compression of float 32 values which happen to arrive in a float 64 representation (these values will have many zero bits in the least significant portion, which compress well through a SCALE compression node). Operation 1530 also allows some compression of float 32 and float 64 values which exist within a bounded range, because the exponents of these values are relatively stable and provide some room for OFFSET encoding to further reduce significant bits of the exponent.

A benefit of operation 1540 is compactness. For example, if a sequence of floating point values can be determined to be in the range 0 to 1 and with 6 decimal digits of precision, then these integers can be represented in the range from 0 to 1000000 and stored in 20 bits each (as compared to a 32-bit float 32 or 64-bit float 64 representation). Similarly for character values, operation 1580 is a general purpose representation that serves to provide code simplicity at lower levels of the code. Operation 1575, a narrow optimization for character strings which are all digits, represents all digit character strings by their integer value and produces a good compression ratio. Operation 1570 is a technique which applies well to short strings, e.g., for short strings such as ticker symbols, product IDs, or Y/N fields and provides similar compression benefits as RLE, DICT and BIT-SHAVED DATA.

As an example of computational benefits from computing upon integers versus characters, in evaluating a predicate F(X, Y)→boolean expression, where Y is constant, the function F may be pushed down through the compression hierarchy using a "wrapper node" by transforming Y. If a comparison for a character column is performed to match the value "yyy", and the character column is compressed by fixchar compression, the character column is represented as data X=fixchar(integers), where each value has been converted to an integer using fixchar representation. In this case, the string "yyy" may be converted to an integer, e.g., fixchar ("yyy"). Then, F(fixchar(integers), "yyy")=F(integers, fixchar("yyy")). Evaluating a predicate, e.g., according to the operators "==" or "!=" on integers, is generally much faster than evaluating the predicate on character values.

In still other embodiments, unary operations may involve character data, and character data may be converted to integer data in order to apply integer compression schemes. For example, a database query may involve filtering rows of data based on a field, e.g., "MI", where the data has been converted and compressed as a 16-bit integer. The predicate value "MI" may also be converted into integer data, and pushed through the same transformation.

In other embodiments, these operations may be combined. A predicate evaluation X=="yyy" on data X=RLE(lengths, Dictionary(keys, Fixchar(integers))) may be reduced to integers==fixchar'("yyy"), operating only on a few values.

In other embodiments, transformational coding may involve factoring out constant factors. For example, if a query is performed to determine whether values are equal to "7", where the values are multiples of 4 and are stored by dividing the values by 4 (transformed value), then the query will be false for all values. If a query is performed to determine whether any values are greater than 7, then a transformed value>1 would indicate that this condition is true for the value.

Other examples of a transform for evaluating query predicates include recognizing instances in which character data is all digit data, and parsing the data as integer values. Predicates involving all digit data may be transformed into integer data, and queries performed accordingly. For example, this would apply in the case of a predicate=="1273" against data which was compressed using the all-digits representation technique of operation 1575.

Figure 12:
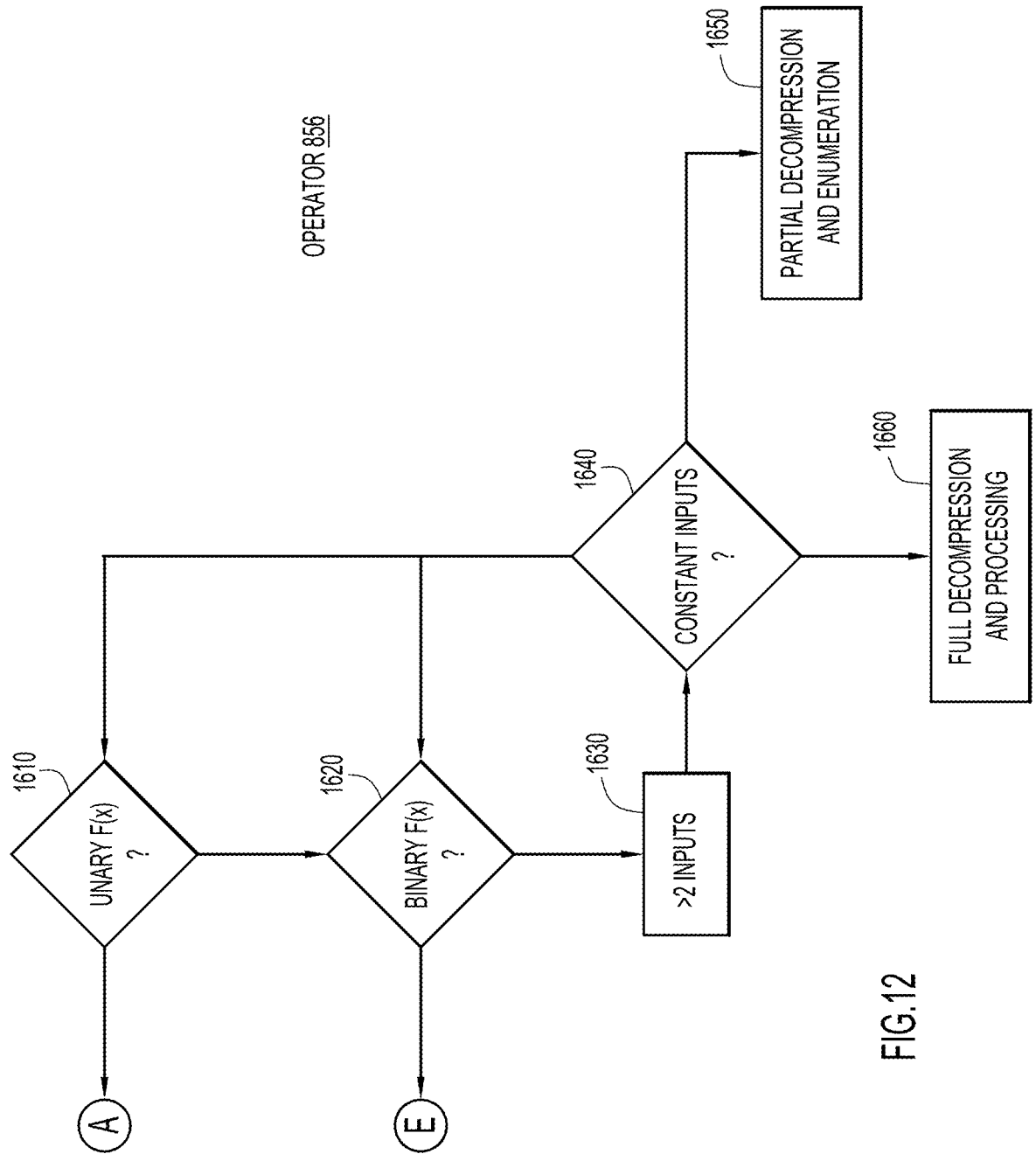
FIG. 12 is a procedural flow diagram of an operator in accordance with an embodiment of the present invention.

FIG. 12 shows an example of an operator 856 according to present invention embodiments. At operation 1610, operator 856 may determine whether the data has a single input for processing by a unary function. If so, the process continues according to the example embodiment at FIG. 8. Otherwise, at operation 1620, operator 856 may determine whether the data has two inputs for processing by a binary function. If so, the process may continue according to the example embodiments at FIGS. 9, 10A and 10B. Otherwise, at operation 1630, the data is determined to have more than two inputs, and at operation 1640, the data is evaluates to determine whether any of the inputs are constant. If one input is constant, the data may be treated as binary and processed using binary processing. If two inputs are constant, the data may be treated as a unary function and processed according to unary processing. In the event that the data has three inputs or more, and none of the inputs are constant, additional computational techniques may be applied. At operation 1650, partial decompression and enumeration may be performed, which provides computational benefits over full decompression and processing. According to an example embodiment of operation 1650, constant inputs may be identified and these inputs may be bound, so that the function has fewer variable inputs. Then, one of the remaining arguments may be selected to enumerate without fully decompressing. The remaining non-constant arguments are fully decompressed and placed into arrays. By enumerating the chosen input one value at a time, and obtaining the other values from the arrays, the result is computed. This approach may be beneficial if one of the inputs is particularly large when decompressed, e.g. large string values. Otherwise, full decompression and processing is performed at operation 1660. For example, all inputs are decompressed into arrays of values, and the entries are processed one array index at a time evaluating the function.

As an example for an RLE compression scheme, the compressed data may have a set of run lengths which is common across many sets of data on many different columns all of which were repeated using the same set of repeat counts. If an operation is performed on two of those sets of data, e.g., comparing the first column to the second column, then the output would have the same run length values and whose distinct values portion is formed by performing binary operations on the distinct values portion of two inputs.

As another example, streams of values having similar compressed characteristics may be computed upon with fewer computations, also referred to as parallel compression. For a summation of multiple units of integers, if each data stream is RLE compressed and has the same run length, then just the run values need to be computed upon. Accordingly, a computational node may be created in which the inputs are the RLE values of each data stream, and the output is the result of the computation performed on the run values along with the original run lengths.

As an example regarding dictionary compression, streams of values which are dictionary coded with small dictionaries may allow creation of a dictionary node with keys of each stream combined, or bitwise concatenated, with the values combined by performing the computation. For example, for relatively small dictionaries, the size of the first dictionary may be multiplied by the second dictionary, and the combined dictionary may have a size less than the resulting number of rows for processing a section. In such cases, it may be worthwhile to produce the cross product dictionary as one side of a dictionary node and a new set of keys which are the concatenation of the keys from the two inputs, which is essentially a lookup into the cross product dictionary. A computational benefit will be produced if performing the binary operation is more expensive than the bitstream concatenation; in general, most binary operations will be more computationally expensive.

As another example, two RLE input streams of data, may have a total number of runs small enough to interleave run boundaries, and may be subject to a concatenation operations. Accordingly, the first input, "AAAA AAAA AABB" may be concatenated with the second input "CCCD DDEE EEEE" to produce "ACACAC ADADAD AEAEAEAE BE BE." From the two input sets of run lengths, a new set of run lengths may be found, corresponding to (3,3,4,2), the length of AC, AD, AE and BE, respectfully. Thus, it is apparent that four computations may be performed on the concatenated data, one each for AC, AD, AE and BE, to arrive at a set of new values. This is much more efficient than decompressing each RLE input stream and performing 12 computations on decompressed data, and then recompressing. Even though the data are not from the same object, the two sets of RLE data have the same run length, and thus, computational short cuts may be applied. This case may frequently occur in database systems, in which data is sorted, arranged in a time-series or clustered to produce similar run length boundaries.

Similar compression schemes may be employed in some embodiments. For example, streams of values which are similarly encoded may have differing characteristics, but may still be computed upon with fewer computations as compared to traditional manners of performing query evaluation. Such data streams may correspond to different objects, from different sources, or have different run lengths. If each data stream is RLE compressed with differing and large run lengths, then the number of distinct pairings of values among different streams is likely to be low. A RLE node may be constructed with the intersections of all of the runs, such that each corresponding unique value is computed upon only once. Similarly, streams of values which are dictionary coded with small dictionaries may allow creation of a dictionary node with keys of each stream combined, or bitwise concatenated, with the values combined by performing the computation.

Figure 13:
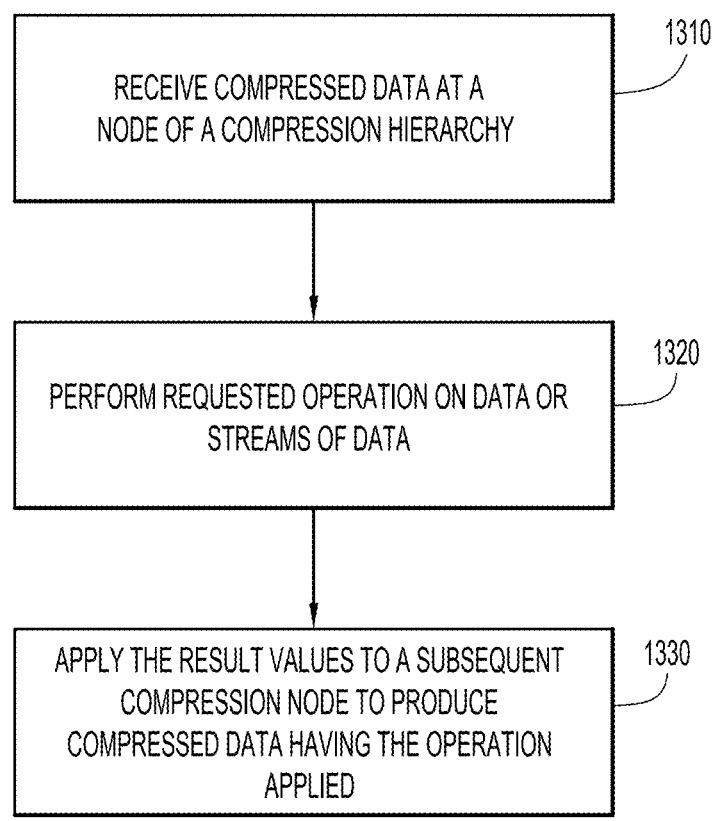
FIG. 13 is a procedural flow diagram showing an example of performing query predicate evaluation at an intermediate node in a compression hierarchy, in accordance with an embodiment of the present invention.

FIG. 13 is a flow chart of an example of performing a requested operation at an intermediate location in a compression hierarchy. At operation 1310, compressed data is received at a compression node of a compression hierarchy. At operation 1320, a requested operation on data or streams of data is performed at a node in the compression hierarchy (e.g., a node, an intermediate node, etc.) by determining an intermediate location in the compression hierarchy and applying the requested operation for uncompressed data to compressed data received from an intermediate compression node proximate the location. In some embodiments, a compression hierarchy may comprise multiple levels or tiers, each level or tier associated with one or more layers of compression. An intermediate location in a compression hierarchy may refer to a level or tier greater than the first level. At operation 1330, the result values are applied to a subsequent compression node to produce compressed data having the operation applied.

The processor 1520 may be embodied by one or more microprocessors or microcontrollers, and executes software instructions stored in memory 1530 for hierarchical compression logic at 1535 and predicate evaluation and transformation logic at 1546, as shown in FIGS. 1-12.

It is noted that blades/nodes 139 (of backend system 138) and front end system 105 may be implemented by any conventional or other computer systems preferably equipped with a display or monitor, a base (e.g., including at least one processor 1520, one or more memories 1530 and/or internal or external network interfaces or communications devices 1510 (e.g., modem, network cards, etc.)), optional input devices (e.g., a keyboard, mouse or other input device), and any commercially available and custom software (e.g., server/communications software, browser/interface software, compression and other modules, etc.).

The hierarchical compression and predicate evaluation and transformation logic may include one or more modules or units to perform the various functions of present invention embodiments described above. The various modules (e.g., hierarchical compression 1535, predicate evaluation and transformation logic 1546, etc.) may be implemented by any combination of any quantity of software and/or hardware modules or units, and may reside within memory 1530 of the back end system for execution by processor 1520.

Present invention embodiments may utilize computational techniques to achieve greater efficiency in query predicate evaluation for data that has been hierarchically compressed. Such techniques allow a portion of the compressed data to be evaluated and subjected to subsequent analysis, rather than performing computations on a larger (or the entire) uncompressed data set. These computations may be performed at runtime, or alternatively, be stored for subsequent retrieval.

It will be appreciated that the embodiments described above and illustrated in the drawings represent only a few of the many ways of implementing embodiments for hierarchical data compression.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software (e.g., software for hierarchical compression logic 1535, predicate evaluation and transformation logic 1546, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry. The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., hierarchical compression logic 1535, predicate evaluation and transformation logic 1546, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., predicted compression statistics, compressed data, information associated with predicate evaluation of compressed data, etc.). The database system may be implemented by any number of any conventional or other databases, data stores or storage structures (e.g., files, databases, data structures, data or other repositories, etc.) to store information (e.g., predicted compression statistics, compressed data, information associated with predicate evaluation, etc.). The database system may be included within or coupled to the server and/or client systems. The database systems and/or storage structures may be remote from or local to the computer or other processing systems, and may store any desired data (e.g., predicted compression statistics, compressed data, information associated with predicate evaluation, etc.).

The present invention embodiments may employ any number of any type of user interface (e.g., Graphical User Interface (GUI), command-line, prompt, etc.) for obtaining or providing information (e.g., predicted compression statistics, compressed data, information associated with predicate evaluation, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, in a data processing system comprising at least one processor and at least one memory, the at least one memory comprising instructions executed by the at least one processor to cause the at least one processor to process data, the computer-implemented method comprising:
    implementing a compression hierarchy including a plurality of compression nodes performing different types of data compression, wherein data from table columns of a database is compressed by a first compression node and is subsequently compressed by one or more subsequent compression nodes in the compression hierarchy;
    receiving a requested operation for uncompressed data within a query predicate to evaluate the query predicate for a chunk of data from one or more of the table columns of the database, wherein the requested operation is a computation on data in the chunk for the query predicate and is applicable to compressed data produced by a corresponding type of compression, and wherein the corresponding type of compression generates the compressed data comprising a plurality of parameters including a value parameter specifying a subset of values of data in the chunk and an attribute parameter indicating an arrangement of the subset of values for generating the uncompressed data, and wherein the corresponding type of compression includes one or more from a group of: run length encoding and dictionary encoding;
    pushing evaluation of the query predicate through the compression hierarchy by determining an intermediate location in the compression hierarchy of compression nodes to apply the requested operation to compressed data of the chunk, wherein determining the intermediate location comprises:
        evaluating a type of compression and characteristics of compressed data produced by each of the plurality of compressions nodes; and
        determining the intermediate location in the compression hierarchy providing compressed data with the corresponding type of compression for the requested operation;
    applying the requested operation to the value parameter of compressed data produced by a compression node proximate the determined location to produce result values without decompressing the compressed data, wherein the result values include the attribute parameters from the compressed data of the compression node proximate the determined location and the value parameters from the compressed data of the compression node proximate the determined location modified by application of the requested operation;
    applying the result values to a subsequent compression node in the compression hierarchy to produce compressed data having the requested operation applied; and
    evaluating the query predicate on the chunk of data with the requested operation applied and retrieving and decompressing data satisfying the query from the database.

2. The computer-implemented method of claim 1, wherein applying the requested operation further comprises:
    performing the operation, in parallel, on streams of data values of compressed data of the compression node proximate the determined location to produce the result values; and
    applying the result values to the subsequent compression node to produce compressed data having the operation applied.

3. The computer-implemented method of claim 1, wherein the query predicate includes a plurality of different parameters, and applying the requested operation further comprises:
    transforming one or more parameters to provide the plurality of parameters in a common type as the compressed data of the compression node proximate the determined location; and
    wherein evaluating the query predicate is based on the transformed parameters.

4. The computer-implemented method of claim 1, wherein the computation of the requested operation includes a unary computation having a function with a single argument, and the computer-implemented method further comprising:
    determining that the compressed data of the compression node proximate the determined location includes a number (N) of the same values; and
    performing the unary computation on a single value of the compressed data of the compression node proximate the determined location to generate a data set containing N copies of a result of the unary computation.

5. The computer-implemented method of claim 1, wherein the computation of the requested operation includes a unary computation having a function with a single argument, and the computer-implemented method further comprising:
    determining that the compressed data of the compression node proximate the determined location has been compressed by plural compression nodes, and includes plural compression types and data for performing the unary computation;

determining a compression type of the plural compression types associated with the compressed data of the compression node proximate the determined location; and performing the unary computation recursively on each of the plural compression types of the compressed data of the compression node proximate the determined location until encountering a bitshaved compression type.

6. The computer-implemented method of claim 1, wherein the computation of the requested operation includes a binary computation having a function with first and second variables, and the computer-implemented method further comprising:

determining that the compressed data of the compression node proximate the determined location includes data for performing the binary computation, the compressed data of the compression node proximate the determined location comprising data for the first and second variables;

determining whether each value of data for the first variable is the same; and performing the binary computation on the compressed data of the compression node proximate the determined location by treating the binary computation as a unary computation, wherein the first variable of the binary computation is bound to the determined same value of each value of the data for the first variable and the unary computation includes a function having a single argument pertaining to the second variable of the binary computation.

7. The computer-implemented method of claim 6, wherein the data for the first and second variables have been compressed according to a dictionary encoded compression scheme or a run length encoding compression scheme, and the computer-implemented method further comprising:

performing the requested operation on the compressed data of the compression node proximate the determined location, wherein the compressed data of the compression node proximate the determined location has been further compressed to reduce an amount of computation.

8. The computer-implemented method of claim 1, further comprising:

determining that the compressed data of the compression node proximate the determined location comprises data for the computation, wherein the computation includes a function having at least two variables and the compressed data for at least one of the two variables is compressed via a compression scheme using unary encoding, and wherein unary encoding comprises encoding by a function having a single argument;

determining a compatible encoding for the at least two variables, wherein the compatible encoding is performed by a compression node in the compression hierarchy subsequent the compression node proximate the determined location providing the compressed data using the unary encoding, and wherein the compatible encoding corresponds to one of: run length encoding and dictionary encoding;

removing the unary encoding from the compressed data of the subsequent compression node performing the compatible encoding and performing the requested operation on the compressed data in the compatible encoding.

9. The computer-implemented method of claim 1, further comprising:

performing the requested operation on the compressed data of the compression node proximate the determined location, wherein the computation is performed for each distinct data value within the compressed data of the compression node proximate the determined location.

10. The computer-implemented method of claim 1, wherein the requested operation includes evaluation of data that is of a floating point type or of a character type, and applying the requested operation further comprises:

transforming the data in the floating point type or the character type into an integer data type; and wherein evaluating the query predicate is based on the transformed data.

11. The computer-implemented method of claim 1, wherein determining the intermediate location further comprises:

in response to the first compression node and one or more subsequent compression nodes lacking the corresponding type of compression for applying the requested operation to compressed data, compressing the data from the table columns of the database by two or more compression nodes of the compression hierarchy, wherein the two or more compression nodes include the corresponding type of compression for applying the requested operation to compressed data.

* * * * *